(12) United States Patent
Zhang et al.

(10) Patent No.: US 11,127,980 B2
(45) Date of Patent: Sep. 21, 2021

(54) LOCALIZED SUPERCONCENTRATED ELECTROLYTES FOR SILICON ANODES

(71) Applicant: Battelle Memorial Institute, Richland, WA (US)

(72) Inventors: Ji-Guang Zhang, Richland, WA (US); Haiping Jia, Richland, WA (US); Xiaolin Li, Richland, WA (US); Wu Xu, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 354 days.

(21) Appl. No.: 16/247,143

(22) Filed: Jan. 14, 2019

(65) Prior Publication Data
US 2019/0148775 A1 May 16, 2019

Related U.S. Application Data

(63) Continuation-in-part of application No. 16/119,641, filed on Aug. 31, 2018, now Pat. No. 10,854,923, and
(Continued)

(51) Int. Cl.
*H01M 10/0569* (2010.01)
*H01M 10/0525* (2010.01)
(Continued)

(52) U.S. Cl.
CPC ....... *H01M 10/0569* (2013.01); *H01M 4/133* (2013.01); *H01M 4/134* (2013.01); *H01M 4/364* (2013.01); *H01M 4/366* (2013.01); *H01M 4/386* (2013.01); *H01M 4/587* (2013.01); *H01M 4/621* (2013.01); *H01M 4/622* (2013.01);
(Continued)

(58) Field of Classification Search
None
See application file for complete search history.

(56) References Cited

U.S. PATENT DOCUMENTS

| 4,086,403 A | 4/1978 | Whittingham et al. |
| 5,830,660 A | 11/1998 | Hillman et al. |

(Continued)

FOREIGN PATENT DOCUMENTS

| CN | 106299244 A | 1/1917 |
| CN | 106876815 A | 6/1917 |

(Continued)

OTHER PUBLICATIONS

Chalasani et al., "Methylene ethylene carbonate: Novel additive to improve the high temperature performance of lithium ion batteries," *Journal of Power Sources* (Jun. 15, 2012) 208 (2012): 67-73.
(Continued)

*Primary Examiner* — Alix E Eggerding
(74) *Attorney, Agent, or Firm* — Klarquist Sparkman, LLP

(57) ABSTRACT

Localized superconcentrated electrolytes (LSEs) for use in systems with silicon-based or carbon/silicon composite-based anodes are disclosed. The LSEs include an active salt, a nonaqueous solvent in which the active salt is soluble, and a diluent in which the active salt has a solubility at least 10 times less than solubility of the active salt in the nonaqueous solvent. Systems including the LSEs also are disclosed.

20 Claims, 11 Drawing Sheets

Related U.S. Application Data a continuation-in-part of application No. 15/788,188, filed on Oct. 19, 2017, now Pat. No. 10,472,571.

(60) Provisional application No. 62/671,304, filed on May 14, 2018, provisional application No. 62/770,696, filed on Nov. 21, 2018.

(51) Int. Cl.
| | |
|---|---|
| H01M 10/0568 | (2010.01) |
| H01M 10/0567 | (2010.01) |
| H01M 4/36 | (2006.01) |
| H01M 4/587 | (2010.01) |
| H01M 4/62 | (2006.01) |
| H01M 4/38 | (2006.01) |
| H01M 4/134 | (2010.01) |
| H01M 10/42 | (2006.01) |
| H01M 4/133 | (2010.01) |
| H01M 4/505 | (2010.01) |
| H01M 4/525 | (2010.01) |

(52) U.S. Cl.
CPC ... *H01M 10/0525* (2013.01); *H01M 10/0567* (2013.01); *H01M 10/0568* (2013.01); *H01M 10/4235* (2013.01); *H01M 4/505* (2013.01); *H01M 4/525* (2013.01); *H01M 2300/004* (2013.01); *H01M 2300/0037* (2013.01)

(56) References Cited

U.S. PATENT DOCUMENTS

| | | | |
|---|---|---|---|
| 6,040,091 | A | 3/2000 | Sugita et al. |
| 8,815,453 | B1 | 8/2014 | Tsukamoto |
| 10,367,232 | B2 | 7/2019 | Zhang et al. |
| 2007/0243470 | A1 | 10/2007 | Yamamoto et al. |
| 2010/0209782 | A1 | 8/2010 | Choi et al. |
| 2011/0111308 | A1 | 5/2011 | Halalay et al. |
| 2011/0200855 | A1 | 8/2011 | Yamada et al. |
| 2012/0141883 | A1 | 6/2012 | Smart et al. |
| 2014/0125292 | A1 | 5/2014 | Best et al. |
| 2014/0342249 | A1 | 11/2014 | He et al. |
| 2015/0364801 | A1 | 12/2015 | Wijaya et al. |
| 2016/0020489 | A1 | 1/2016 | Rhodes et al. |
| 2016/0240896 | A1 | 8/2016 | Zhang et al. |
| 2016/0254567 | A1 | 9/2016 | Cai et al. |
| 2016/0294005 | A1 | 10/2016 | Lee et al. |
| 2016/0329567 | A1 | 11/2016 | Lee et al. |
| 2016/0344063 | A1 | 11/2016 | Chang et al. |
| 2016/0380314 | A1 | 12/2016 | Yang et al. |
| 2017/0062829 | A1 | 3/2017 | Ryu et al. |
| 2017/0098858 | A1 | 4/2017 | Kim et al. |
| 2017/0133716 | A1 | 5/2017 | Masuda et al. |
| 2017/0162910 | A1 | 6/2017 | Katou et al. |
| 2017/0187031 | A1* | 6/2017 | Kurita ............... H01M 4/131 |
| 2017/0331152 | A1 | 11/2017 | Kim et al. |
| 2017/0352908 | A1* | 12/2017 | Noguchi .......... H01M 10/0569 |
| 2018/0251681 | A1 | 9/2018 | Zhang et al. |
| 2018/0254524 | A1 | 9/2018 | Zhang et al. |
| 2018/0331393 | A1 | 11/2018 | Cho et al. |
| 2019/0123390 | A1 | 4/2019 | Xu et al. |
| 2019/0140322 | A1 | 5/2019 | Ren et al. |
| 2019/0148775 | A1 | 5/2019 | Zhang et al. |
| 2020/0161706 | A1 | 5/2020 | Cao et al. |

FOREIGN PATENT DOCUMENTS

| | | |
|---|---|---|
| CN | 107978794 A | 5/2018 |
| JP | 2000 294281 A1 | 10/2000 |
| JP | 2002-27022 A | 9/2002 |
| JP | 2012-169138 A | 9/2012 |
| WO | WO 2015-158755 A1 | 10/2015 |
| WO | WO 2016/010090 A1 | 1/2016 |

OTHER PUBLICATIONS

Hyung et al., "Flame-retardant additives for lithium-ion batteries," *Journal of Power Sources* (2003) 119-121 383-387.

International Search Report and Written Opinion, dated Nov. 27, 2017, issued in International Application No. PCT/US2017/033391.

International Search Report and Written Opinion, dated Jan. 2, 2019, issued in International Application No. PCT/US2018/049141.

Lee et al., "A novel flame-retardant additive for lithium batteries," *Electrochemical and Solid-State Letters*, (Dec. 16, 1999) 3(2): 63-65.

Matsumoto et al., "A highly safe battery with a non-flammable triethyl-phosphate-based electrolyte," *Journal of Power Sources* (Oct. 2, 2014) 273: 954-958.

Shiga et al., "Self-extinguishing electrolytes using fluorinated alkyl phosphates for lithium batteries," *Journal of Materials Chemistry A* (Feb. 8, 2017) 5: 5156-5162.

Shigematsu et al., "Thermal behavior of charged graphite and $LixCoO_2$ in electrolytes containing alkyl phosphate for lithium-ion cells," *Journal of the Electrochemical Society* (Jan. 9, 2009) 156(3): A176-A180.

Shim et al., "Electrochemical performance of lithium-ion batteries with triphenylphosphate as a flame-retardant additive," *Journal of Power Sources* (May 10, 2007) 172: 919-924.

Smart et al., "The evaluation of triphenyl phosphate as a flame retardant additive to improve the safety of lithium-ion battery electrolytes," ECS Transactions (2011) 35(13): 1-11.

Smith et al., "Lithium-ion electrolytes containing flame-retardant additives for increased safety characteristics," *ECS Transactions* (2009) 16(35): 33-41.

Wang et al., "Nonflammable trimethyl phosphate solvent-containing electrolytes for lithium-ion batteries: I. Fundamental properties," *Journal of the Electrochemical Society*, (Aug. 24, 2001) 148(10): A1058-A1065.

Wang et al., "Nonflammable trimethyl phosphate solvent-containing electrolytes for lithium-ion batteries: II, The use of an amorphous carbon anode," *Journal of the Electrochemical Society*, (Aug. 24, 2001) 148(10): A1066-A1071.

Xiang et al., "Dimethyl methylphosphonate (DMMP) as an efficient flame retardant additive for the lithium-ion battery electrolytes," *Journal of Power Sources* (May 6, 2007) 173: 562-564.

Xu et al., "An attempt to formulate nonflammable lithium ion electrolytes with alkyl phosphates and phosphazenes," *Journal of the Electrochemical Society* (Apr. 2, 2002) 149(5): A622-A626.

Xu et al., "Nonflammable electrolytes for Li-ion batteries based on a fluorinated phosphate," *Journal of the Electrochemcial Society* (Jul. 2, 2002) 149(8): A1079-A1082.

Yao et al., "Comparative study of trimethyl phosphite and trimethyl phosphate as electrolyte additives in lithium ion batteries," *Journal of Power Sources* (2005) 144: 170-175.

Zhang et al., "Tris (2,2,2-trifluoroethyl) phosphite as a co-solvent for nonflammable electrolytes in Li-ion batteries," *Journal of Power Sources* (2003) 113: 166-172.

International Search Report and Written Opinion issued for International Application No. PCT/US2019/062276 dated Mar. 13, 2020.

Office Action dated Feb. 5, 2020, for U.S. Appl. No. 16/119,641, 20 pp.

Extended European Search Report, dated Nov. 23, 2020, issued in European Patent Application No. EP 17 89 8487.

Office Action, dated Apr. 26, 2019, issued in U.S. Appl. No. 15/788,188.

Chen et al., "High-Voltage Lithium-Metal Batteries Enabled by Localized High-Concentration Electrolytes," *Advanced Materials* 2018, 30:1706102, 7 pp.

Office action dated Jan. 18, 2019, for U.S. Appl. No. 15/599,298, 11 pp.

International Search Report and Written Opinion, dated May 7, 2020, issued for International Application No. PCT/US2020/013363.

Ding et al., "Effects of carbonate solvents and lithium salts on morphology and coulombic efficiency of lithium electrode," *Journal of the Electrochemical Society* Sep. 4, 2013, 160(10): A1894-A1901.

(56) References Cited

OTHER PUBLICATIONS

Doi, et al., "Dilution of highly concentrated $LiBF_4$-propylene carbonate electrolyte solution with fluoroalkyl ethers for 5-V $LiNi_{0.5}Mn_{1.5}O_4$ positive electrodes," *Journal of the Electrochemical Society* Jan. 24, 2017, 164(1): A6412-A6416.

Dokko et al., "Solvate ionic liquid electrolyte for Li—S batteries," *Journal of the Electrochemical Society* Jun. 6, 2013, 160: A1304-A1310.

Kasnatscheew et al., "Determining oxidative stability of battery electrolytes: validity of common electrochemical stability window (ESW) data and alternative strategies," *Physical Chemistry Chemical Physics* Jun. 5, 2017, 19:16078-16086.

Li et al. "Atomic structure of sensitive battery materials and interfaces revealed by cryo-electron microscopy," *Science* Oct. 27, 2017, 358:506-510.

Li et al., "Li+-Desolvation Dictating Lithium-Ion Battery Low-Temperature Performances," *ACS Appl. Mater. Interfaces* Nov. 17, 2017, 9:18826, accepted manuscript, 21 pp.

Office Action, dated Feb. 19, 2021, issued in related China Patent Application No. 201880066668, 15 pages.

Qian et al., "High rate and stable cycling of lithium metal anodes," *Nature Communications* Feb. 20, 2015, pp. 1-9.

Ren et al., "Enabling High-Voltage Lithium-Metal Batteries under Practical Conditions," *Joule* Jul. 17, 2019, 3(7):1662-1676.

Suo et al., "'Water-in-salt' electrolyte enables high-voltage aqueous lithium-ion chemistries," *Science* Nov. 20, 2015, 350(6263): 938-944.

Wang et al., "Fire-extinguishing organic electrolytes for safe batteries," *Nature Energy* Jan. 2018 (published online Nov. 27, 2017), 3(1), 22-29.

Wang et al., "Superconcentrated electrolytes for a high-voltage lithium-ion battery," *Nature Communications* Jun. 29, 2016, 12032: 1-9.

Xu et al., "Lithium metal anodes for rechargeable batteries," *Energy & Environmental Science* 2014 (published Oct. 29, 2013), 7:513-537.

Yamada et al., "Review—Superconcentrated electrolytes for lithium batteries," *Journal of the Electrochemical Society* Oct. 9, 2015, 162(14): A2406-A2423.

Zhang, "Li metal anodes and Li metal batteries," presented at the 3rd International Forum on Cathode & Anode Materials for Advanced Batteries, Apr. 14-15, 2017, 21 pp.

Zheng et al., "Electrolyte additive enabled fast charging and stable cycling lithium metal batteries," *Nature Energy* Feb. 27, 2017, 2:1-8.

Zhu et al., "Perfluoroalkyl-substituted ethylene carbonates: Novel electrolyte additives for high-voltage lithium-ion batteries," *J. of Power Sources* 2014 (published online Jul. 25, 2013), 246:184-191.

\* cited by examiner

LOCALIZED SUPERCONCENTRATED ELECTROLYTES FOR SILICON ANODES

CROSS REFERENCE TO RELATED APPLICATIONS

This application is a continuation-in-part of application Ser. No. 16/119,641, filed Aug. 31, 2018, which claims the benefit of the earlier filing date of U.S. Provisional Application No. 62/671,304, filed May 14, 2018, and this application is a continuation-in-part of U.S. application Ser. No. 15/788,188, filed Oct. 19, 2017; this application also claims the benefit earlier filing date of U.S. Provisional Application No. 62/770,696, filed Nov. 21, 2018, each of which is incorporated by reference in its entirety herein.

ACKNOWLEDGMENT OF GOVERNMENT SUPPORT

This invention was made with Government support under Contract No. DE-AC05-76RL01830 awarded by the U.S. Department of Energy. The Government has certain rights in the invention.

FIELD

This invention is directed to localized superconcentrated electrolytes for stable cycling of systems including silicon-based or carbon/silicon composite-based anodes, the electrolytes including an active salt, a solvent in which the active salt is soluble, and a diluent in which the active salt is insoluble or poorly soluble.

SUMMARY

Localized superconcentrated electrolytes (LSEs) (also referred to as localized high concentration electrolytes (LHCEs)) for use in lithium ion batteries with silicon-based or carbon/silicon composite-based anodes are disclosed. Systems including the LSEs also are disclosed.

Some embodiments of the disclosed systems include an anode comprising silicon and an electrode comprising (a) an active salt comprising lithium cations; (b) a nonaqueous solvent comprising (i) a carbonate other than fluoroethylene carbonate (FEC), (ii) a flame retardant compound, or (iii) both (i) and (ii), wherein the active salt is soluble in the nonaqueous solvent; and (c) a diluent comprising a fluoroalkyl ether, a fluorinated orthoformate, or a combination thereof, wherein the active salt has a solubility in the diluent at least 10 times less than a solubility of the active salt in the nonaqueous solvent. In some embodiments, the electrolyte further comprises from 2-30 wt % FEC. The system may further comprise a cathode.

In any of the above embodiments, the active salt may comprise lithium bis(fluorosulfonyl)imide (LiFSI), lithium bis(trifluoromethanesulfonyl)imide (LiTFSI), lithium bis(pentafluoroethanesulfonyl)imide (LiBETI), lithium bis(oxalato)borate (LiBOB), $LiPF_6$, $LiAsF_6$, $LiBF_4$, $LiCF_3SO_3$, $LiClO_4$, lithium difluoro oxalato borate anion (LiDFOB), LiI, LiBr, LiCl, LiSCN, $LiNO_3$, $LiNO_2$, $Li_2SO_4$, or any combination thereof. In some embodiments, the active salt has a molar concentration in the electrolyte within a range of from 0.5-6 M.

In some embodiments, the nonaqueous solvent comprises a carbonate other than FEC. In certain embodiments, the carbonate is a mixture of ethylene carbonate (EC) and ethyl carbonate (EMC). In some embodiments, the nonaqueous solvent comprises a flame retardant compound comprising an organic phosphate, an organic phosphite, an organic phosphonate, an organic phosphoramide, a phosphazene, or any combination thereof. In certain embodiments, the flame retardant compound comprises triethyl phosphate, trimethyl phosphate, tributyl phosphate, triphenyl phosphate, tris(2,2,2-trifluoroethyl) phosphate, bis(2,2,2-trifluoroethyl) methyl phosphate; trimethyl phosphite, triphenyl phosphite, tris(2,2,2-trifluoroethyl) phosphite; dimethyl methylphosphonate, diethyl ethylphosphonate, diethyl phenylphosphonate, bis(2,2,2-trifluoroethyl) methylphosphonate; hexamethylphosphoramide; hexamethoxyphosphazene, hexafluorophosphazene, or any combination thereof.

In any of the above embodiments, the diluent may comprise bis(2,2,2-trifluoroethyl) ether (BTFE), 1,1,2,2-tetrafluoroethyl-2,2,3,3-tetrafluoropropyl ether (TTE), 1,1,2,2,-tetrafluoroethyl-2,2,2-trifluoroethyl ether (TFTFE), methoxynonafluorobutane (MOFB), ethoxynonafluorobutane (EOFB), tris(2,2,2-trifluoroethyl)orthoformate (TFEO), tris(hexafluoroisopropyl)orthoformate (THFiPO), tris(2,2-difluoroethyl)orthoformate (TDFEO), bis(2,2,2-trifluoroethyl) methyl orthoformate (BTFEMO), tris(2,2,3,3,3-pentafluoropropyl)orthoformate (TPFPO), tris(2,2,3,3-tetrafluoropropyl)orthoformate (TTPO), or any combination thereof. In some embodiments, the diluent comprises BTFE, TTE, TFEO, or any combination thereof.

In some embodiments, the electrolyte comprises 1-3 M LiFSI, EC-EMC in a ratio of from 4:6 to 2:8 by weight or TEPa, 0-30 wt % FEC (e.g., 0 wt % FEC, 5-30 wt % FEC, or 5-10 wt % FEC), and the diluent, wherein the diluent comprises BTFE, TTE, TFEO, or any combination thereof. In one embodiment, the electrolyte comprises EC-EMC, and a molar ratio of EC-EMC to the diluent is within a range of from 1-3. In another embodiment, the electrolyte comprises TEPa, and a molar ratio of TEPa to the diluent is within a range of 2-4.

In any of the above embodiments, the anode may comprise a graphite/silicon composite. In some embodiments, the anode further comprises a lithium polyacrylate or polyimide binder. In certain embodiment, the silicon is carbon-coated nano-silicon.

In some embodiments, the anode comprises a graphite/silicon composite with a polyimide binder wherein the silicon is carbon-coated nano-silicon, and the electrolyte comprises 1-3 M LiFSI, TEPa, 0-30 wt % FEC, and the diluent, wherein the diluent is BTFE, TTE, TFEO, or any combination thereof, and wherein a molar ratio of TEPa to the diluent is within a range of 2-4. In certain embodiments, the anode is prelithiated, the system further comprises a cathode, and the system has a capacity retention ≥80% after 100 cycles.

In some embodiments, the anode comprises a graphite/silicon composite with a lithium polyacrylate binder, and the electrolyte comprises 1-3 M LiFSI, EC-EMC (3:7 by weight), 0-30 wt % FEC, and the diluent, wherein the diluent is BTFE, TTE, TFEO, or any combination thereof, and wherein a molar ratio of EC-EMC to the diluent is within a range of 1-3. In certain embodiments, the system further comprises a cathode and has a a capacity retention ≥70% after 100 cycles.

The foregoing and other objects, features, and advantages of the invention will become more apparent from the following detailed description, which proceeds with reference to the accompanying figures.

DETAILED DESCRIPTION

Figure 1:
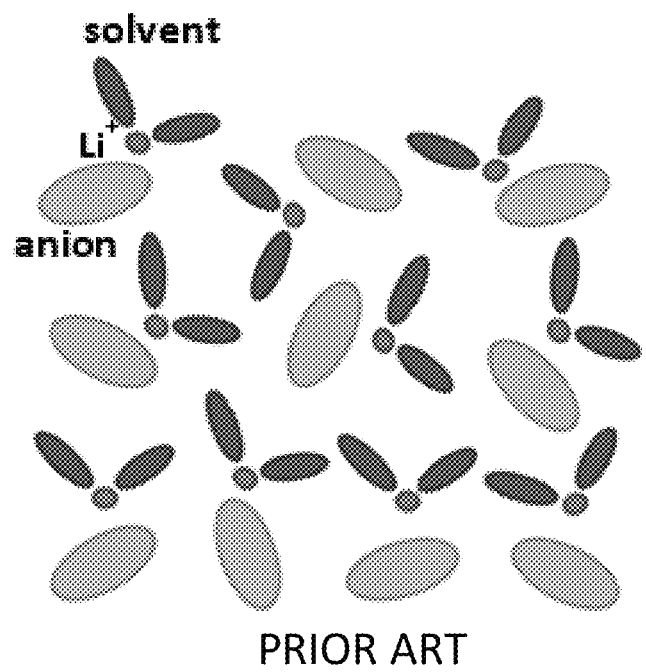
FIG. 1 is a schematic illustration of a superconcentrated electrolyte (SE) comprising a lithium salt and a solvent.

This disclosure concerns embodiments of localized superconcentrated electrolytes (LSEs) for use in systems, such as lithium ion battery systems. Systems including the LSEs are also disclosed. Some embodiments of the disclosed LSEs are stable in electrochemical cells with silicon-based, carbon/silicon-based, carbon-based (e.g., graphite- and/or hard carbon-based), tin-based, or antimony-based anodes and various cathode materials. The LSEs comprise an active salt, a solvent in which the active salt is soluble, and a diluent in which the active salt is insoluble or poorly soluble.

I. Definitions and Abbreviations

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, molecular weights, molarities, voltages, capacities, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximates unless the word "about" is recited.

Although there are alternatives for various components, parameters, operating conditions, etc. set forth herein, that does not mean that those alternatives are necessarily equivalent and/or perform equally well. Nor does it mean that the alternatives are listed in a preferred order unless stated otherwise.

Definitions of common terms in chemistry may be found in Richard J. Lewis, Sr. (ed.), *Hawley's Condensed Chemical Dictionary*, published by John Wiley & Sons, Inc., 2016 (ISBN 978-1-118-13515-0).

In order to facilitate review of the various embodiments of the disclosure, the following explanations of specific terms are provided:

Active salt: As used herein, the term "active salt" refers to a salt that constitutes at least 5% of the redox active materials participating in redox reactions during battery cycling after initial charging.

AN: acetonitrile

Anode: An electrode through which electric charge flows into a polarized electrical device. From an electrochemical point of view, negatively-charged anions move toward the anode and/or positively-charged cations move away from it to balance the electrons leaving via external circuitry. In a discharging battery or galvanic cell, the anode is the negative terminal where electrons flow out. If the anode is composed of a metal, electrons that it gives up to the external circuit are accompanied by metal cations moving away from the electrode and into the electrolyte. When the battery is recharged, the anode becomes the positive terminal where electrons flow in and metal cations are reduced.

Associated: As used here, the term "associated" means coordinated to or solvated by. For example, a cation that is associated with a solvent molecule is coordinated to or solvated by the solvent molecule. Solvation is the attraction of solvent molecules with molecules or ions of a solute. The association may be due to electronic interactions (e.g., ion-dipole interactions and/or van der Waals forces) between the cation and the solvent molecule. Coordination refers to formation of one or more coordination bonds between a cation and electron lone-pairs of solvent atoms. Coordination bonds also may form between the cation and anion of the solute.

Bridge solvent: A solvent having amphiphilic molecules with a polar end or moiety and a nonpolar end or moiety.

BTFE: bis(2,2,2-trifluoroethyl) ether

Capacity: The capacity of a battery is the amount of electrical charge a battery can deliver. The capacity is typically expressed in units of mAh, or Ah, and indicates the maximum constant current a battery can produce over a period of one hour. For example, a battery with a capacity of 100 mAh can deliver a current of 100 mA for one hour or a current of 5 mA for 20 hours. Areal capacity or specific areal capacity is the capacity per unit area of the electrode (or active material) surface, and is typically expressed in united of mAh cm$^{-2}$.

Carbon black: A finely divided form of carbon, typically made by incomplete combustion of vaporized heavy oil fractions. Carbon black can also be made from methane or natural gas by cracking or combustion.

Carbon/silicon composite: As used herein, the term carbon/silicon composite refers to a material including both carbon (such as graphite and/or hard carbon) and silicon. A composite material is made from two or more constituent materials that, when combined, produce a material with characteristics different than those of the individual components. Carbon/silicon composites may be prepared, for example, by pyrolysis of pitch embedded with graphite and silicon powders (see, e.g., Wen et al., *Electrochem Comm* 2003, 5(2):165-168).

Cathode: An electrode through which electric charge flows out of a polarized electrical device. From an electrochemical point of view, positively charged cations invariably move toward the cathode and/or negatively charged anions move away from it to balance the electrons arriving from external circuitry. In a discharging battery or galvanic cell, the cathode is the positive terminal, toward the direction of conventional current. This outward charge is carried internally by positive ions moving from the electrolyte to the positive cathode, where they may be reduced. When the battery is recharged, the cathode becomes the negative terminal where electrons flow out and metal atoms (or cations) are oxidized.

Cell: As used herein, a cell refers to an electrochemical device used for generating a voltage or current from a chemical reaction, or the reverse in which a chemical reaction is induced by a current. Examples include voltaic cells, electrolytic cells, and fuel cells, among others. A battery includes one or more cells. The terms "cell" and "battery" are used interchangeably when referring to a battery containing only one cell.

Coin cell: A small, typically circular-shaped battery. Coin cells are characterized by their diameter and thickness.

Conversion compound: A compound comprising one or more cations, which are displaced by another metal when a battery is discharged. For example, when iron (II) selenide (FeSe) is used as a cathode material, Fe is replaced by Na during discharge of a Na battery:

2Na$^+$+2e$^-$+FeSe⇌Na$_2$Se+Fe

Coulombic efficiency (CE): The efficiency with which charges are transferred in a system facilitating an electrochemical reaction. CE may be defined as the amount of charge exiting the battery during the discharge cycle divided by the amount of charge entering the battery during the charging cycle. CE of Li‖Cu or Na‖Cu cells may be defined as the amount of charge flowing out of the battery during stripping process divided by the amount of charge entering the battery during plating process.

DEC: diethyl carbonate
DMC: dimethyl carbonate
DME: dimethoxyethane
DMSO: dimethyl sulfoxide
DOL: 1,3-dioxolane Donor number: A quantitative measure of Lewis basicity, such as a solvent's ability to solvate cations. A donor number is defined as the negative enthalpy value for the 1:1 adduct formation between a Lewis base and SbCl$_5$ in dilute solution in 1,2-dichloroethane, which has a donor number of zero. The donor number is typically reported in units of kcal/mol. Acetonitrile, for example, has a donor number of 14.1 kcal/mol. As another example, dimethyl sulfoxide has a donor number of 29.8 kcal/mol.

EC: ethylene carbonate

Electrolyte: A substance containing free ions that behaves as an electrically conductive medium. Electrolytes generally comprise ions in a solution, but molten electrolytes and solid electrolytes also are known.

EMC: ethyl methyl carbonate
EMS: ethyl methyl sulfone
EOFB: ethoxynonafluorobutane
EVS: ethyl vinyl sulfone
FEC: fluoroethylene carbonate
FCE: first-cycle Coulombic efficiency Flame retardant: As used herein, the term "flame retardant" refers to an agent that, when incorporated into an electrolyte in a sufficient amount, renders the electrolyte nonflammable or flame retarded as defined herein.

Flammable: The term "flammable" refers to a material that will ignite easily and burn rapidly. As used herein, the term "nonflammable" means that an electrolyte, will not ignite or burn during operation of an electrochemical device including the electrolyte. As used herein, the terms "flame retarded" and "low flammability" are interchangeable and mean that a portion of the electrolyte may ignite under some conditions, but that any resulting ignition will not propagate throughout the electrolyte. Flammability can be measured by determining the self-extinguishing time (SET) of the electrolyte. The SET is determined by a modified Underwriters Laboratories test standard 94 HB. An electrolyte is immobilized on an inert ball wick, such as a ball wick having a diameter of ~0.3-0.5 cm, which is capable of absorbing 0.05-0.10 g electrolyte. The wick is then ignited, and the time for the flame to extinguish is recorded. The time is normalized against the sample weight. If the electrolyte does not catch flame, the SET is zero and the electrolyte is nonflammable. Electrolytes having an SET of <6 s/g (e.g., the flame extinguishes within ~0.5 s) are also considered nonflammable. If the SET is >20 s/g, the electrolyte is considered to be flammable. When the SET is between 6-20 s/g, the electrolyte is considered to be flame retarded or have low flammability.

Fluorinated orthoformate: A fluorinated compound having a general formula

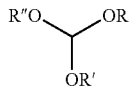

wherein at least one of R, R', and R" is fluoroalkyl and the other two substituents are independently fluoroalkyl or alkyl. The alkyl chains may be linear or branched. R, R', and R" may be the same or may be different from one another. One or more of R, R', and R" may be perfluorinated.

Fluoroalkyl: An alkyl group wherein at least one H atom has been replaced by a F atom. A perfluoroalkyl group is an alkyl group in which all H atoms have been replaced by F atoms.

Fluoroalkyl ether (hydrofluoroether, HFE): As used herein, the terms fluoroalkyl ether and HFE refer to a fluorinated ether having a general formula R—O—R', wherein one of R and R' is fluoroalkyl and the other of R and R' is fluoroalkyl or alkyl. The alkyl chain may be linear or branched. The ether may be perfluorinated where each of R and R' is perfluoroalkyl. R and R' may be the same or may be different from one another.

Hard carbon: A non-graphitizable carbon material. At elevated temperatures (e.g., >1500° C.) a hard carbon remains substantially amorphous, whereas a "soft" carbon will undergo crystallization and become graphitic.

Immiscible: This term describes two substances of the same state of matter that cannot be uniformly mixed or blended. Oil and water are a common example of two immiscible liquids.

Intercalation: A term referring to the insertion of a material (e.g., an ion or molecule) into the microstructure of another material. For example, lithium ions can insert, or intercalate, into graphite (C) to form lithiated graphite ($LiC_6$).

LiFSI: lithium bis(fluorosulfonyl)imide
LiTFSI: lithium bis(trifluoromethylsulfonyl)imide
LiBOB: lithium bis(oxalato)borate
LiDFOB: lithium difluoro oxalato borate anion
LiPAA: lithium polyacrylate
LSE: localized superconcentrated electrolyte
MEC: methylene ethylene carbonate
MOFB: methoxynonafluorobutane
PC: propylene carbonate Phosphate: As used herein, phosphate refers to an organophosphate having a general formula $P(=O)(OR)_3$ where each R independently is alkyl (e.g., $C_1$-$C_{10}$ alkyl) or aryl.

Each alkyl or aryl group may be substituted or unsubstituted.

Phosphite: As used herein, phosphite refers to an organophosphite having a general formula $P(OR)_3$ or $HP(O)(OR)_2$ where each R independently is alkyl (e.g., $C_1$-$C_{10}$ alkyl) or aryl.

Each alkyl or aryl group may be substituted or unsubstituted.

Phosphonate: A compound having a general formula $P(=O)(OR)_2(R')$ wherein each R and R' independently is alkyl (e.g., $C_1$-$C_{10}$ alkyl), or aryl. Each alkyl or aryl group may be substituted or unsubstituted.

Phosphoramide: A compound having a general formula $P(=O)(NR_2)_3$ wherein each R independently is hydrogen, alkyl (e.g., $C_1$-$C_{10}$ alkyl), or alkoxy (e.g., $C_1$-$C_{10}$ alkoxy). At least one R is not hydrogen. Each alkyl or aryl group may be substituted or unsubstituted.

Phosphazene: A compound in which a phosphorus atom is covalently linked to a nitrogen atom or nitrogen-containing group by a double bond and to three other atoms or radicals by single bonds.

PI: polyimide

Separator: A battery separator is a porous sheet or film placed between the anode and cathode. It prevents physical contact between the anode and cathode while facilitating ionic transport.

Soluble: Capable of becoming molecularly or ionically dispersed in a solvent to form a homogeneous solution. As used herein, the term "soluble" means that an active salt has a solubility in a given solvent of at least 1 mol/L (M, molarity) or at least 1 mol/kg (m, molality).

Solution: A homogeneous mixture composed of two or more substances. A solute (minor component) is dissolved in a solvent (major component). A plurality of solutes and/or a plurality of solvents may be present in the solution.

Superconcentrated: As used herein, the term "superconcentrated electrolyte" refers to an electrolyte having a salt concentration of at least 3 M.

TDFEO: tris(2,2-difluoroethyl)orthoformate
TEPa: triethyl phosphate
TFEO: tris(2,2,2-trifluoroethyl)orthoformate
TFTFE: 1,1,2,2-tetrafluoroethyl-2,2,2-trifluoroethyl ether
THFiPO: tris(hexafluoroisopropyl)orthoformate
TMPa: trimethyl phosphate
TMTS: tetramethylene sulfone or sulfolane
TPFPO: tris(2,2,3,3,3-pentafluoropropyl)orthoformate
TTE: 1,1,2,2-tetrafluoroethyl-2,2,3,3-tetrafluoropropyl ether
TTPO: tris(2,2,3,3-tetrafluoropropyl)orthoformate
VC: vinylene carbonate
VEC: 4-vinyl-1,3-dioxolan-2-one II. Localized Superconcentrated Electrolytes A superconcentrated electrolyte comprises a solvent and a salt with a salt concentration of at least 3 M. Some superconcentrated electrolytes have a salt concentration of at least 4 M or at least 5 M. In certain instances, the salt molality may be up to 20 m or more, e.g., aqueous LiTFSI. FIG. 1 is a schematic illustration of a conventional superconcentrated electrolyte comprising a solvent and a lithium salt. Desirably, all or a large majority of the solvent molecules are associated with a lithium cation in the superconcentrated electrolyte. A reduced presence of free, unassociated solvent molecules may increase Coulombic efficiency (CE) of a lithium metal anode and/or reversible insertion of Li-ions into a carbon—(e.g., graphite and/or hard carbon) and/or silicon-based anode, facilitate formation of a stabilized solid electrolyte interphase (SEI) layer, and/or increase cycling stability of a battery including the electrolyte. However, superconcentrated electrolytes have disadvantages, such as high material cost, high viscosity, and/or poor wetting of battery separators and/or cathodes. While dilution with additional solvent can resolve one or more of the disadvantages, dilution results in free solvent molecules and often decreases CE, hinders formation of the stabilized SEI layer, and/or decreases cycling stability of a battery.

Figure 2:
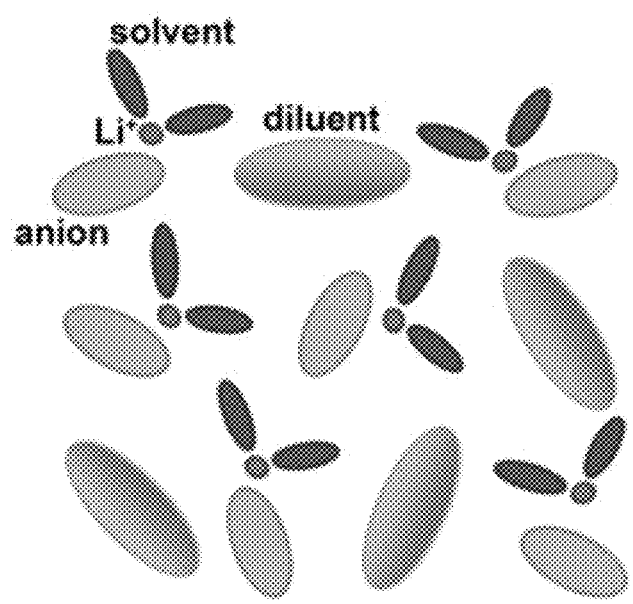
FIG. 2 is a schematic illustration of an exemplary localized superconcentrated electrolyte (LSE) comprising a lithium salt, a solvent in which the lithium salt is soluble, and a diluent, i.e., a component in which the lithium salt is insoluble or poorly soluble compared to the solvent.

FIG. 2 is a schematic illustration of an exemplary "localized superconcentrated electrolyte" (LSE). An LSE includes a lithium salt, a solvent in which the lithium salt is soluble, and a diluent in which the lithium salt is insoluble or poorly soluble. As shown in FIG. 2, the lithium ions remain associated with solvent molecules after addition of the diluent. The anions are also in proximity to, or associated with, the lithium ions. Thus, localized regions of solvent-cation-anion aggregates are formed. In contrast, the lithium ions and anions are not associated with the diluent molecules, which remain free in the solution. Evidence of this electrolyte structure with regions of locally concentrated salt/solvent and free diluent molecules is seen by Raman spectroscopy (e.g., as shown in US 2018/0251681 A1, which is incorporated by reference herein), NMR characterization, and molecular dynamics (MD) simulations. Thus, although the solution as a whole is less concentrated than the solution of FIG. 1, there are localized regions of high concentration where the lithium cations are associated with the solvent molecules. There are few to no free solvent molecules in the diluted electrolyte, thereby providing the benefits of a superconcentrated electrolyte without the associated disadvantages.

Conventional electrolytes and conventional superconcentrated electrolytes often provide only limited cycle life in battery systems with anodes comprising silicon. Some LSEs also provide poor results with anodes comprising silicon. In some instances, the compatibility of the electrolyte and the silicon-containing anode depends at least in part on the composition of a binder present in the anode. However, certain embodiments of the disclosed LSEs can resolve some or all of the problems discussed above. In addition to being compatible with silicon-containing anodes, including carbon/silicon composite-based anodes, some embodiments of the disclosed LSEs also are compatible with carbon-based, tin-based, and/or antimony-based anodes.

Embodiments of the disclosed LSEs include an active salt, a solvent A, wherein the active salt is soluble in the solvent A, and a diluent, wherein the active salt is insoluble or poorly soluble in the diluent. As used herein, "poorly soluble" means that the active salt has a solubility in the diluent at least 10× less than a solubility of the active salt in the solvent A.

The solubility of the active salt in the solvent A (in the absence of diluent) may be greater than 3 M, such as at least 4 M or at least 5 M. In some embodiments, the solubility and/or concentration of the active salt in the solvent A is within a range of from 3 M to 10 M, such as from 3 M to 8 M, from 4 M to 8 M, or from 5 M to 8 M. In certain embodiments, such as when solvent A comprises water, the concentration may be expressed in terms of molality and the concentration of the active salt in the solvent A (in the absence of diluent) may be within a range of from 3 m to 25 m, such as from 5 m to 21 m, or 10 m to 21 m. In contrast, the molar or molal concentration of the active salt in the electrolyte as a whole (salt, solvent A, and diluent) may be at least 20% less than the molar or molal concentration of the active salt in the solvent A, such as at least 30% less, at least 40% less, at least 50% less, at least 60% less, or even at least 70% less than the molar or molal concentration of the active salt in the solvent A. For example, the molar or molal concentration of the active salt in the electrolyte may be 20-80% less, 20-70% less, 30-70% less, or 30-50% less than the molar or molal concentration of the active salt in the solvent A. In some embodiments, the molar concentration of the active salt in the electrolyte is within a range of 0.5 M to 6 M, 0.5 M to 3 M, 0.5 M to 2 M, 0.75 M to 2 M, or 0.75 M to 1.5 M.

The active salt is a salt, or combination of salts, that participates in the charge and discharge processes of a cell including the electrolyte. The active salt comprises a cation that is capable of forming redox pairs having different oxidation and reduction states, such as ionic species with differing oxidation states or a metal cation and its corresponding neutral metal atom. In some embodiments, the active salt is an alkali metal salt, an alkaline earth metal salt, or any combination thereof. The active salt may be a lithium salt or a mixture of lithium salts. Exemplary salts include, but are not limited to, lithium bis(fluorosulfonyl)imide (LiFSI), lithium bis(trifluoromethylsulfonyl)imide (LiTFSI), lithium bis(oxalato)borate (LiBOB), $LiPF_6$, $LiAsF_6$, $LiBF_4$, $LiN(SO_2CF_3)_2$, $LiN(SO_2F)_2$, $LiCF_3SO_3$, $LiClO_4$, lithium difluoro oxalato borate anion (LiDFOB), LiI, LiBr, LiCl, LiOH, $LiNO_3$, $LiSO_4$, and combinations thereof. In some embodiments, the salt is LiFSI, LiTFSI, or a combination thereof. In certain examples, the salt is LiFSI.

The solvent associates with (e.g., solvates or coordinates) cations of the active salt or salt mixture. When prepared as a superconcentrated electrolyte comprising the active salt and the solvent, solvent-cation-anion aggregates form. Some embodiments of the disclosed superconcentrated electrolytes are stable toward anodes (e.g., a carbon- and/or silicon-based, tin-based, or antimony-based anode), cathodes (including ion intercalation and conversion compounds), and/or current collectors (e.g., Cu, Al) that may be unstable when lower concentration electrolytes are used and/or when other solvents are used.

Suitable solvents for use as solvent A include, but are not limited to, certain carbonate solvents, ether solvents, phosphorus-containing solvents, and mixtures thereof. In some embodiments, solvent A comprises, consists essentially of, or consists of a carbonate solvent, a flame retardant compound, or a combination thereof. The term "consists essentially of" means that the solvent does not include other solvents, such as ethers, water, and the like, in any appreciable amount (e.g., >1 wt %). Suitable carbonate solvents include, but are not limited to, dimethyl carbonate (DMC), ethyl methyl carbonate (EMC), diethyl carbonate (DEC), ethylene carbonate (EC), propylene carbonate (PC), vinylene carbonate (VC), fluoroethylene carbonate (FEC), difluoroethylene carbonate (DFEC), trifluoroethylene carbonate (TFEC), 4-vinyl-1,3-dioxolan-2-one (VEC), 4-methylene-1,3-dioxolan-2-one, 4-methylene ethylene carbonate (MEC), methyl 2,2,2-trifluoroethyl carbonate (MFEC), 4,5-dimethylene-1,3-dioxolan-2-one, and combinations thereof.

Suitable flame retardant compounds include, but are not limited to, phosphorus containing compounds. The amount of flame retardant in solvent A is sufficient to maintain low flammability or nonflammability of the electrolyte. In some embodiments, the flame retardant compound comprises one or more organophosphorus compounds (e.g., organic phosphates, phosphites, phosphonates, phosphoramides), phosphazenes, or any combination thereof. Organic phosphates, phosphites, phosphonates, phosphoramides include substituted and unsubstituted aliphatic and aryl phosphates, phosphites, phosphonates, and phosphoramides. The phosphazenes may be organic or inorganic. Exemplary flame retardant compounds include, e.g., TMPa, TEPa, tributyl phosphate, triphenyl phosphate, tris(2,2,2-trifluoroethyl) phosphate, bis(2,2,2-trifluoroethyl) methyl phosphate, trimethyl phosphite, triphenyl phosphite, tris(2,2,2-trifluoroethyl) phosphite, dimethyl methylphosphonate, diethyl ethylphosphonate, diethyl phenylphosphonate, bis(2,2,2-trifluoroethyl) methylphosphonate, hexamethylphosphoramide, hexamethoxyphosphazene (cyclo-tris(dimethoxyphosphonitrile), hexamethoxycyclotriphosphazene), hexafluorophosphazene (hexafluorocyclotriphosphazene), and combinations thereof. In some embodiments, a low flammability or nonflammable LSE comprises at least 5 wt % or at least 10 wt % of the flame retardant compound. In certain embodiments, the low flammability or nonflammable LSE comprises 5-75 wt % of the flame retardant compound, such as 5-60 wt %, 5-50 wt %, 5-40 wt % or 5-30 wt %, 10-60 wt %, 10-50 wt %, 10-40 wt %, or 10-30 wt % of the flame retardant compound.

In some embodiments, the solvent A comprises a carbonate other than FEC, a flame retardant compound, or a combination thereof. In certain embodiments, the carbonate other than FEC, the flame retardant compound, or the combination thereof constitutes at least 50 wt %, at least 60 wt %, at least 70 wt %, at least 80 wt %, or at least 90 wt % of the solvent A. In some embodiments, solvent A is EC, EMC, TEPa, or a combination thereof. In one embodiment, solvent A comprises, consists essentially of, or consists of EC and EMC, where EC and EMC are present in a weight ratio of from 2:8 to 4:6. In some examples, solvent A comprises, consists essentially of, or consists of EC-EMC in a ratio of 3:7 by weight. In an independent embodiment, solvent A comprises, consists essentially of, or consists of TEPa.

In any of the above embodiments, solvent A may further comprise FEC. In some embodiments, the electrolyte further comprises from greater than zero to 30 wt % FEC, such as from greater than zero to 20 wt %, from greater than zero to 10 wt %, from 0.5-30 wt % FEC, from 2-30 wt % FEC, from 5-30 wt % FEC, from 2-10 wt % FEC, or from 5-10 wt % FEC. In another embodiment, the electrolyte includes from greater than zero to 10 mol % FEC, such as 0.2-10 mol % FEC. In one embodiment, solvent A comprises, consists essentially of, or consists of EC, EMC, and FEC, where EC and EMC are present in a weight ratio of from 2:8 to 4:6. In some examples, solvent A comprises, consists essentially of, or consists of EC-EMC in a ratio of 3:7 by weight and FEC. In an independent embodiment, solvent A comprises, consists essentially of, or consists of TEPa and FEC.

The concentration of the active salt may be selected to minimize the number of free solvent A molecules in the electrolyte. Because more than one molecule of solvent A may be associated with each cation of the active salt and/or because more than cation of the active salt may be associated with each molecule of solvent A, the molar ratio of active salt to solvent A may not be 1:1. In some embodiments, a molar ratio of the active salt to the solvent A (moles salt/moles solvent A) is within a range of from 0.33 to 1.5, such as within a range of from 0.5 to 1.5, 0.67 to 1.5, 0.8 to 1.2, or 0.9 to 1.1.

The diluent is a component in which the active salt is insoluble or has poor solubility, i.e., a solubility at least 10× less than the active salt's solubility in the solvent A. For instance, if the salt has a solubility of 5 M in the solvent A, the diluent is selected such that the salt has a solubility of less than 0.5 M in the diluent. In some embodiments, the active salt has a solubility in the solvent A that is at least 10 times, at least 15 times, at least 20 times, at least 25 times, at least 30 times, at least 40 times, or at least 50 times greater than the active salt's solubility in the diluent. The diluent is selected to be stable with the anode, cathode, and current collectors at low active salt concentrations (e.g., ≤3 M) or even without the active salt. In some embodiments, the diluent is selected to have a low dielectric constant (e.g., a relative dielectric constant ≤7) and/or low donor number (e.g., a donor number ≤10). Advantageously, the diluent does not disrupt the solvation structure of solvent A-cation-anion aggregates and is considered inert because it is not interacting with the active salt. In other words, there is no significant coordination or association between the diluent molecules and the active salt cations. The active salt cations remain associated with solvent A molecules. Thus, although the electrolyte is diluted, there are few or no free solvent A molecules in the electrolyte.

In some embodiments, the diluent comprises an aprotic organic solvent. In certain embodiments, the diluent is a fluorinated solvent having a wide electrochemical stability window (e.g., >4.5 V), such as a hydrofluoroether (HFE) (also referred to as a fluoroalkyl ether) or fluorinated orthoformate. HFEs advantageously have low dielectric constants, low donor numbers, reductive stability with the metal of the active salt (e.g., lithium, sodium, and/or magnesium), and/or high stability against oxidation due to the electron-withdrawing fluorine atoms. Exemplary fluorinated solvents include, but are not limited to, 1,1,2,2-tetrafluoroethyl-2,2,3,3-tetrafluoropropyl ether (TTE), bis(2,2,2-trifluoroethyl) ether (BTFE), 1,1,2,2,-tetrafluoroethyl-2,2,2-trifluoroethyl ether (TFTFE), methoxynonafluorobutane (MOFB), ethoxynonafluorobutane (EOFB), tris(2,2,2-trifluoroethyl) orthoformate (TFEO), tris(hexafluoroisopropyl)orthoformate (THFiPO), tris(2,2-difluoroethyl)orthoformate (TDFEO), bis(2,2,2-trifluoroethyl) methyl orthoformate (BTFEMO), tris(2,2,3,3,3-pentafluoropropyl)orthoformate (TPFPO), tris(2,2,3,3-tetrafluoropropyl)orthoformate (TTPO), and combinations thereof.

Flammable Fluoroalkyl Ethers:

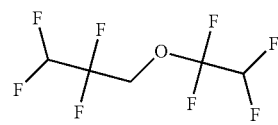

TTE - BP 92° C., FP 27.5° C.

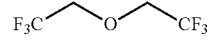

BTFE - BP 62-63° C.,
FP 1° C.

-continued

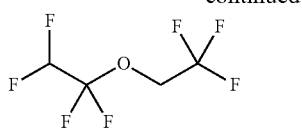

TFTFE - BP 56.7° C., FP n/a

Nonflammable fluoroalkyl ethers:

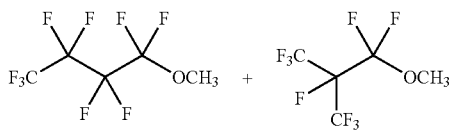

MOFB - mixture of 2 isomers
BP 60° C., autoignition temp. 405° C.

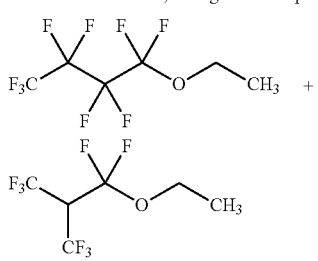

EOFB - mixture of 2 isomers
BP 76° C., autoignition
temp. 434° C.

Fluorinated orthoformates:

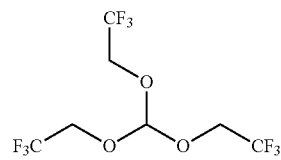

Tris(2,2,2-trifluoroethyl)orthoformate
(TFEO, b.p. 144-146° C.,
flash point 60° C.)

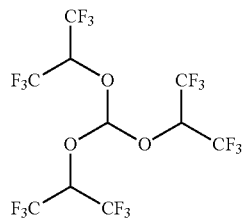

Tris(hexafluoroisopropyl)orthoformate
(THFiPO, b.p. 188 ± 35° C.*)

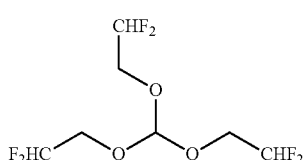

Tris(2,2-difluoroethyl)orthoformate
(TDFEO, b.p. 147 ± 35° C.)

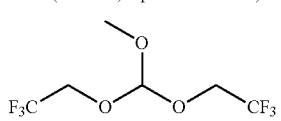

Bis(2,2,2-trifluoroethyl) methyl
orthoformate (BTFEMO, b.p.
119 ± 35° C.)

-continued

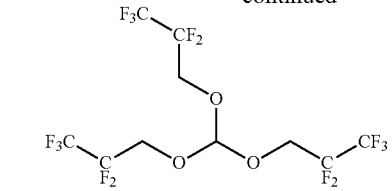

Tris(2,2,3,3,3-
pentafluoropropyl)orthoformate
(TPFPO, b.p. 191 ± 35° C.)

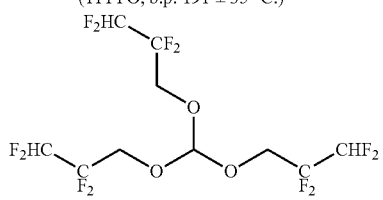

Tris(2,2,3,3-
tetrtafluoropropyl)orthoformate
(TTPO, b.p. 223° C.)

*Boiling points indicated with ± 35° C. are predicted
by ChemDraw® software (PerkinElmer)

The diluent may be flammable or nonflammable. In some embodiments, selecting a nonflammable fluoroalkyl ether or fluorinated orthoformate significantly improves safety of practical rechargeable batteries. For example, MOFB and EOFB are nonflammable linear fluoroalkyl ethers. Some embodiments of the fluorinated orthoformates have a higher boiling point, higher flash point, and lower vapor pressure than other fluoroalkyl ethers. For example, bis(2,2,2-trifluoroethyl) ether (BTFE) has a boiling point of 62-63° C. and a flash point of 1° C., and 1,1,2,2-tetrafluoroethyl-2,2,3,3-tetrafluoropropyl ether (TTE) has a boiling point of 92° C. and a flash point of 27.5° C. These properties may limit their applications at elevated temperatures and raise some safety concerns related to thermal issues. In contrast, the higher boiling points, higher flash points, and lower vapor pressures of the fluorinated orthoformates reduces evaporation of the diluent, which makes it easier to control the electrolyte composition. Additionally, the higher boiling point may provide the electrolyte with increased stability when the battery is operating at elevated temperatures, e.g., at temperatures up to 55° C. TFEO, for example, has a boiling point of 144-146° C. and a flash point of 60° C. Embodiments of the disclosed fluorinated orthoformates also have low melting points and a wide electrochemical stability window. In certain embodiments, a flammable diluent may be used when solvent A comprises a flame retardant compound in an amount sufficient to render the electrolyte flame retarded or nonflammable. In other embodiments, a flammable diluent may be used when the expected operating conditions of the system are relatively nonhazardous (e.g., a relatively low operating temperature).

In some embodiments of the disclosed LSEs, at least 90%, at least 95%, at least 96%, at least 97%, at least 98%, or at least 99% of the molecules of solvent A are associated (e.g., solvated or coordinated) with cations of the active salt. In certain embodiments, fewer than 10%, such as fewer than 5%, fewer than 4%, fewer than 3%, or fewer than 2% of the diluent molecules are associated with cations of the active salt. The degree of association can be quantified by any suitable means, such as by calculating the peak intensity ratio of solvent molecules associated with cations and free solvent in Raman spectra or by using NMR spectra.

The relative amounts of the solvent A and diluent are selected to reduce the cost of materials for the electrolyte, reduce viscosity of the electrolyte, maintain stability of the electrolyte against oxidation at high-voltage cathodes, improve ionic conductivity of the electrolyte, improve wetting ability of the electrolyte, facilitate formation of a stable solid electrolyte interphase (SEI) layer, or any combination thereof. In one embodiment, a molar ratio of the solvent A to the diluent (moles solvent A/moles diluent) in the electrolyte is within a range of from 0.2 to 5, such as within a range of from 0.2 to 4, 0.2 to 3, or 0.2 to 2. In an independent embodiment, a volumetric ratio of the solvent A to the diluent (L solvent/L diluent) in the electrolyte is within a range of from 0.2 to 5, such as within a range of from 0.25 to 4 or 0.33 to 3. In another independent embodiment, a mass ratio of the solvent A to the diluent (g solvent/g diluent) in the electrolyte is within a range of from 0.2 to 5, such as within a range of from 0.25 to 4 or 0.33 to 3.

Advantageously, certain embodiments of the disclosed LSEs allow significant dilution of the active salt without sacrificing performance of the electrolyte. Due to the interactions between cations of the active salt and molecules of solvent A, the behavior of the electrolyte corresponds more closely to the concentration of the active salt in the solvent A. Because the diluent is present, however, the active salt may have a molar concentration in the electrolyte that is at least 20% less than the molar concentration of the active salt in the solvent A. In certain embodiments, the molar concentration of the active salt in the electrolyte is at least 25% less, at least 30% less, at least 40% less, at least 50% less, at least 60% less, at least 70% less, or even at least 80% less than the molar concentration of the active salt in the solvent A. Inclusion of the diluent reduces the electrolyte cost (less salt is used) and reduces the electrolyte viscosity, while preserving the unique functionalities and advantages of high-concentration electrolytes.

In some embodiments, the formation of cation-anion-solvent aggregates also reduces the lowest unoccupied molecular orbital (LUMO) energy of the anion (such as FSI$^-$) of the active salt so they can form a stable SEI. For instance, when the LUMOs of the conduction bands are located at the solvent molecules (such as DMC), the solvent molecules are reductively decomposed first at the anode, leading to an SEI layer which is rich in organic or polymeric component and less mechanically stable, therefore leads to fast capacity degradation upon cycling. In contrast, when the lowest energy level of conduction bands of the anion (such as FSI$^-$) of the active salt in certain embodiments of the disclosed LSEs is lower than those of the solvent (such as DMC), indicating that the anions of the active salt instead of the solvent molecules will be decomposed, forming a stable SEI which is rich in inorganic components (such as LiF, $Li_2CO_3$, $Li_2O$ etc.) which is mechanically robust and can protect anode from degradation during subsequent cycling process.

In some embodiments, the diluent is miscible with solvent A. In other embodiments, the diluent is immiscible with solvent A, e.g., when solvent A comprises water and the diluent is a fluorinated organic solvent as disclosed herein. When the solvent A and the diluent are immiscible, the electrolyte may not be effectively diluted with the diluent.

Figure 3:
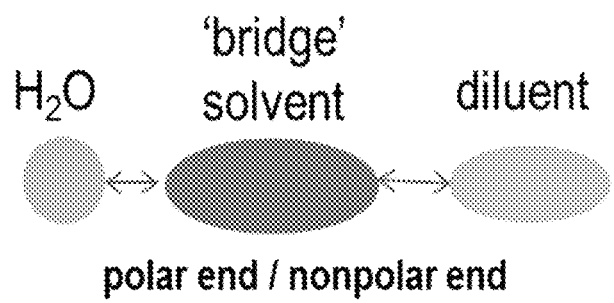
FIG. 3 is a schematic illustration of an exemplary "bridge" solvent molecule between a solvent molecule and a diluent molecule.

Accordingly, in some embodiments, when the diluent is immiscible with solvent A, the electrolyte further comprises a bridge solvent. The bridge solvent has a different chemical composition than either the solvent A or the diluent. The bridge solvent is selected to be miscible with both solvent A and the diluent, thereby enhancing the practical miscibility of solvent A, and the diluent. In some embodiments, molecules of the bridge solvent are amphiphilic, including both a polar end or moiety, and a non-polar end or moiety, such that molecules of the bridge solvent will associate both with molecules of solvent A and molecules of the diluent as shown in FIG. 3, thereby improving the miscibility between solvent A, and the diluent. Exemplary bridge solvents include, but are not limited to, acetonitrile, dimethyl carbonate, diethyl carbonate, propylene carbonate, dimethyl sulfoxide, 1,3-dioxolane, dimethoxyethane, diglyme (bis(2-methoxyethyl) ether), triglyme (triethylene glycol dimethyl ether), tetraglyme (tetraethylene glycol dimethyl ether), and combinations thereof.

In some embodiments, the electrolyte consists essentially of, or consists of, the active salt, the nonaqueous solvent, and the diluent. In certain embodiments, the electrolyte consists essentially of, or consists of, the active salt, the nonaqueous solvent, 2-30 wt % FEC, and the diluent. By "consists essentially of" is meant that the electrolyte does not include other components that materially affect the properties of the electrolyte alone or in a system including the electrolyte. For example, the electrolyte does not include any electrochemically active component (i.e., a component (an element, an ion, or a compound) that is capable of forming redox pairs having different oxidation and reduction states, e.g., ionic species with differing oxidation states or a metal cation and its corresponding neutral metal atom) other than the active salt in an amount sufficient to affect performance of the electrolyte, additional solvents other than carbonates or flame retardant compounds, diluents in which the active salt is soluble, or other additives in a significant amount (e.g., >1 wt %). Exemplary electrolytes include, but are not limited to LiFSI-EC-EMC-BTFE, LiFSI/EC-EMC-FEC-BTFE, LiFSI/TEPa-BTFE, LiFSI/TEPa-FEC-BTFE, LiFSI-EC-EMC-TTE, LiFSI/EC-EMC-FEC-TTE, LiFSI/TEPa-TTE, LiFSI/TEPa-FEC-TTE, LiFSI-EC-EMC-TFEO, LiFSI/EC-EMC-FEC-TFEO, LiFSI/TEPa-TFEO, LiFSI/TEPa-FEC-TFEO, LiFSI/TEPa-EC-BTFE, LiFSI/TEPa-EC-TTE, LiFSI-TEPa-EC-TFEO, LiFSI/TEPa-EC-FEC-BTFE, LiFSI/TEPa-EC-FEC-TTE, LiFSI/TEPa-EC-FEC-TFEO, LiFSI/TEPa-EC-VC-BTFE, LiFSI/TEPa-EC-VC-TTE, LiFSI/TEPa-EC-VC-TFEO, LiFSI/TEPA-EC-LiDFOB-BTFE, LiFSI/TEPA-EC-LiDFOB-TTE, LiFSI/TEPA-EC-LiDFOB-TFEO, LiFSI/TEPa-VC-DMC-BTFE, LiFSI/TEPa-VC-DMC-TTE, and LiFSI/TEPa-VC-DMC-TFEO.

In certain embodiments, the electrolyte comprises, consists essentially of, or consists of LiFSI, EC-EMC or TEPa, 0-30 wt % FEC, and the diluent, wherein the diluent is BTFE, TTE, TFEO, or a combination thereof. The active salt may have a molar concentration in the electrolyte within a range of from 0.5 M to 3 M. In one embodiment, the electrolyte comprises, consists essentially of, or consists of 1-3 M LiFSI, EC-EMC in a ratio of from 4:6 to 2:8 by weight, 0-30 wt % FEC (such as 0 wt % FEC, 0.5-30 wt % FEC, 2-30 wt % FEC, 2-10 wt % FEC, or 5-10 wt % FEC), and the diluent, wherein a molar ratio of EC-EMC (moles EC+moles EMC) to the diluent is within a range of from 1-3. In another embodiment, the electrolyte comprises, consists essentially of, or consists of 1-3 M LiFSI, TEPa, 0-30 wt % FEC (such as 0 wt % FEC, 0.5-30 wt % FEC, or 5-10 wt % FEC), and the diluent, wherein the diluent is BTFE, TTE, TFEO, or any combination thereof, and wherein a molar ratio of TEPa to the diluent is within a range of 2-4. In some examples, the diluent is BTFE.

III. Systems

Embodiments of the disclosed LSEs are useful in systems, such as batteries (e.g., rechargeable batteries). In some embodiments, the disclosed LSEs are useful in lithium ion batteries. In some embodiments, a system comprises an LSE as disclosed herein and an anode. The system may further comprise a cathode, a separator, an anode current collector, a cathode current collector, or any combination thereof. In certain embodiments, the anode comprises silicon.

Figure 4:
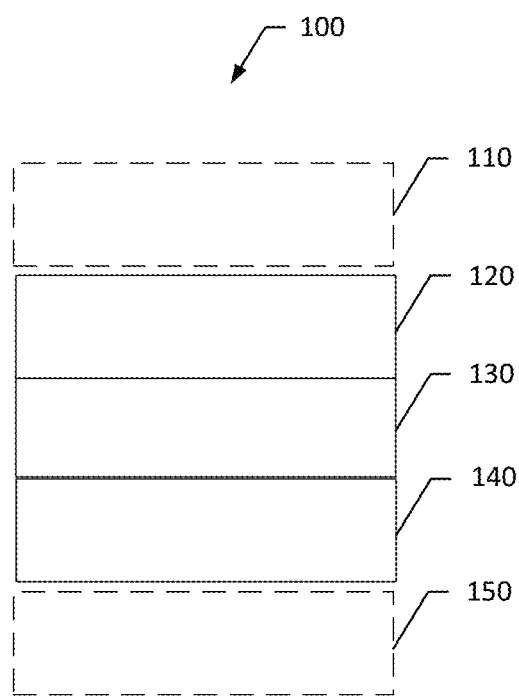
FIG. 4 is a schematic diagram of an exemplary battery.

In some embodiments, a rechargeable battery comprises an LSE as disclosed herein, a cathode, an anode, and optionally a separator. FIG. 4 is a schematic diagram of one exemplary embodiment of a rechargeable battery 100 including a cathode 120, a separator 130 which is infused with an electrolyte (i.e., a LSE), and an anode 140. In some embodiments, the battery 100 also includes a cathode current collector 110 and/or an anode current collector 150.

The current collectors can be a metal or another conductive material such as, but not limited to, nickel (Ni), copper (Cu), aluminum (Al), iron (Fe), stainless steel, or conductive carbon materials. The current collector may be a foil, a foam, or a polymer substrate coated with a conductive material. Advantageously, the current collector is stable (i.e., does not corrode or react) when in contact with the anode or cathode and the electrolyte in an operating voltage window of the battery. The anode and cathode current collectors may be omitted if the anode or cathode, respectively, are free standing, e.g., when the anode is metal or a free-standing film comprising an intercalation material or conversion compound, and/or when the cathode is a free-standing film. By "free-standing" is meant that the film itself has sufficient structural integrity that the film can be positioned in the battery without a support material.

In some embodiments, including some embodiments of a rechargeable lithium ion battery, the anode is a silicon-based, carbon-based (e.g., graphite- and/or hard carbon-based), carbon- and silicon-based (e.g., a carbon/silicon composite), tin-based, or antimony-based anode. By "carbon-based anode" is meant that a majority of the total anode mass is activated carbon material, such as at least 70 wt %, at least 80 wt %, or at least 90 wt % activated carbon material, e.g., graphite, hard carbon, or a mixture thereof. By "silicon-based anode" is meant that the anode contains a certain minimum amount of silicon, such as at least 30%, at least 50 wt %, at least 60 wt %, or at least 70 wt % silicon. By "carbon/silicon-based anode" is meant that a majority of the total anode mass is activated carbon and silicon, such as at least 70 wt %, at least 80 wt %, or at least 90 wt % of a combination of activated carbon and silicon. By "tin-based anode" or "antimony-based anode" is meant that a majority of the total anode mass is tin or antimony, respectively, such as at least 70 wt %, at least 80 wt %, or at least 90 wt % tin or antimony, respectively. In some embodiments, the anode is a graphite- and/or silicon-based anode, or a tin-based anode. In certain embodiments, the anode comprises silicon, such as a silicon-based anode or carbon/silicon-based (e.g., silicon-graphite composite) anode. In some examples, the silicon is nano-silicon and/or carbon coated. For instance, the silicon may be carbon-coated nano-silicon, where the silicon is carbon-coated by chemical vapor deposition (CVD) or other approaches. In one embodiment, the silicon is a C/Si composite comprising 10 wt % CVD carbon.

The anode may further include one or more binders and/or conductive additives. Suitable binders include, but are not limited to, polyacrylates (e.g., lithium polyacrylate, LiPAA), polyimides (PI), polyvinyl alcohol, polyvinyl chloride, polyvinyl fluoride, ethylene oxide polymers, polyvinylpyrrolidone, polyurethane, polytetrafluoroethylene, polyvinylidene fluoride, polyethylene, polypropylene, styrene-butadiene rubber, epoxy resin, nylon, and the like. Suitable conductive additives include, but are not limited to, carbon black, acetylene black, Ketjen black, carbon fibers (e.g., vapor-grown carbon fiber), metal powders or fibers (e.g., Cu, Ni, Al), and conductive polymers (e.g., polyphenylene derivatives). In some embodiments, the anode is prelithiated to at least 5% of capacity, at least 10% of capacity, at least 20% of capacity, at least 50% of capacity, or up to 100% capacity. Prelithiation is particularly useful when a cathode with no lithium source is used.

In some embodiments, the anode is a silicon/graphite composite anode comprising 70-75 wt % graphite, 10-20 wt % silicon, 0-5 wt % conductive carbon black, and 8-12 wt % binder. The silicon may be carbon-coated nano-silicon, such as a C/Si composite comprising 5-15 wt % CVD carbon. In certain embodiments, the binder comprises LiPAA or PI. In one example, the anode comprises 70-75 wt % graphite, 12-18 wt % silicon, greater than zero to 5 wt % conductive carbon black, and 8-12 wt % LiPAA. In another example, the anode comprises 70-75 wt % graphite, 12-18 wt % carbon-coated nano-silicon (20 wt % carbon), greater than zero to 5 wt % conductive carbon black, and 5-15 wt % PI.

Exemplary cathodes for lithium ion batteries include, but are not limited to, Li-rich $Li_{1+w}Ni_xMn_yCo_zO_2$ (x+y+z+w=1, 0≤w≤0.25), $LiNi_xMn_yCo_zO_2$ (NMC, x+y+z=1), $LiCoO_2$, $LiNi_{0.8}Co_{0.15}Al_{0.05}O_2$ (NCA), $LiNi_{0.5}Mn_{1.5}O_4$ spinel, $LiMn_2O_4$ (LMO), $LiFePO_4$ (LFP), $Li_{4-x}M_xTi_5O_{12}$ (M=Mg, Al, Ba, Sr, or Ta; 0≤x≤1), $MnO_2$, $V_2O_5$, $V_6O_{13}$, $LiV_3O_8$, $LiM^{C1}_xM^{C2}_{1-x}PO_4$ ($M^{C1}$ or $M^{C2}$=Fe, Mn, Ni, Co, Cr, or Ti; 0≤x≤1), $Li_3V_{2-x}M^1_x(PO_4)_3$ ($M^1$=Cr, Co, Fe, Mg, Y, Ti, Nb, or Ce; 0≤x≤1), $LiVPO_4F$, $LiM^{C1}_xM^{C2}_{1-x}O_2$ (($M^{C1}$ and $M^{C2}$ independently are Fe, Mn, Ni, Co, Cr, Ti, Mg, or Al; 0≤x≤1), $LiM^{C1}_xM^{C2}_yM^{C3}_{1-x-y}O_2$(($M^{C1}$, $M^{C2}$, and $M^{C3}$ independently are Fe, Mn, Ni, Co, Cr, Ti, Mg, or Al; 0≤x≤1; 0≤y≤1, 0≤x+y≤1), $LiMn_{2-y}X_yO_4$ (X=Cr, Al, or Fe, 0≤y≤1), $LiNi_{0.5-y}X_yMn_{1.5}O_4$ (X=Fe, Cr, Zn, Al, Mg, Ga, V, or Cu; 0≤y≤0.5), $xLi_2MnO_3\cdot(1-X)LiM^{C1}_yM^{C2}_zM^{C3}_{1-y-z}O_2$ ($M^{C1}$, $M^{C2}$, and $M^{C3}$ independently are Mn, Ni, Co, Cr, Fe, or mixture thereof; x=0.3-0.5; y≤0.5; z≤0.5), $Li_2M_2SiO_4$ ($M^2$=Mn, Fe, or Co), $Li_2M^2SO_4$ ($M^2$=Mn, Fe, or Co), $LiM^2SO_4F$ ($M^2$=Fe, Mn, or Co), $Li_{2-x}(Fe_{1-y}Mn_y)P_2O_7$ (0≤x≤1; 0≤y≤1), $Cr_3O_8$, $Cr_2O_5$, a carbon/sulfur composite, or an air electrode (e.g., a carbon-based electrode comprising graphitic carbon and, optionally, a metal catalyst such as Ir, Ru, Pt, Ag, or Ag/Pd). In an independent embodiment, the cathode may be a lithium conversion compound, such as $Li_2O_2$, $Li_2S$, or LiF. In some examples, the cathode is an NMC cathode.

The separator may be glass fiber, a porous polymer film (e.g., polyethylene- or polypropylene-based material) with or without a ceramic coating, or a composite (e.g., a porous film of inorganic particles and a binder). One exemplary polymeric separator is a Celgard® K1640 polyethylene (PE) membrane. Another exemplary polymeric separator is a Celgard® 2500 polypropylene membrane. Another exemplary polymeric separator is a Celgard® 3501 surfactant-coated polypropylene membrane. The separator may be infused with an electrolyte, as disclosed herein.

In some embodiments, a battery includes a carbon-based, silicon-based, carbon- and silicon-based, tin-based, or antimony-based anode, a cathode suitable for a lithium ion battery, a separator, and an LSE comprising (a) an active salt comprising lithium cations, (b) a nonaqueous solvent comprising (i) a carbonate other than fluoroethylene carbonate (FEC), (ii) a flame retardant compound, or (iii) both (i) and (ii), wherein the active salt is soluble in the nonaqueous solvent, and (c) a diluent comprising a fluoroalkyl ether, a fluorinated orthoformate, or a combination thereof, wherein the active salt has a solubility in the diluent at least 10 times less than a solubility of the active salt in the nonaqueous solvent. The electrolyte may further include up to 30 wt % FEC, such as 5-30 wt % FEC or 5-10 wt % FEC. In certain embodiments, the anode comprises silicon, i.e., the anode is a silicon-based or carbon/silicon composite-based anode. In some embodiments, the cathode comprises $LiNi_xMn_yCo_zO_2$ (NMC), $LiNi_{0.85}Co_{0.15}Al_{0.05}O_2$ (NCA), or $LiCoO_2$ (LCO). In certain embodiments, the cathode comprises $LiNi_xMn_y\text{-}Co_zO_2$ (NMC). In some examples, the electrolyte comprises, consists essentially of, or consists of LiFSI, EC-EMC or TEPa, 0-30 wt % FEC (e.g., 0 wt % FEC, 5-30 wt % FEC, 5-10 wt % FEC), and the diluent, wherein the diluent consists of BTFE, TTE, TFEO, or a combination thereof. In one embodiment, when the anode is a carbon-silicon composite including LiPAA as the binder, the electrolyte includes EC-EMC. In another embodiment, when the anode is a carbon-silicon composite including PI as the binder, the electrolyte includes TEPa.

Advantageously, some embodiments of the disclosed lithium ion batteries including an LSE are operable at high voltages, e.g., a voltage of 4.2 V or higher, such as a voltage ≥4.3 V. In certain embodiments, the battery is operable at voltages up to 4.5 V.

In some embodiments, a lithium ion battery comprising an LSE as disclosed herein has a performance equal to, or better than, a comparable lithium battery including the same anode and cathode with a conventional electrolyte or a superconcentrated electrolyte. For example, the lithium ion battery with the disclosed LSE may have a specific capacity, a Coulombic efficiency, and/or a capacity retention equal to or greater than the comparable battery with the conventional electrolyte or superconcentrated electrolyte. A lithium ion battery with a disclosed LSE also may exhibit a cycling stability as indicated by percent capacity retention equal to, or better than that of, a comparable lithium ion battery including including the same anode and cathode with a conventional electrolyte or a superconcentrated electrolyte. For example, a lithium ion battery with a silicon/graphite composite anode and a disclosed LSE may have a capacity retention of at least 70%, at least 75%, at least 80%, at least 85%, or even at least 90% at 100 cycles. The lithium ion battery may have a first cycle Coulombic efficiency of at least 50%, at least 60%, at least 70%, or at least 75%. In some examples, the first cycle Coulombic efficiency is improved by using a prelithiated anode as disclosed herein.

IV. Examples

Example 1

Si/Gr∥NMC532 Cells Using LSEs with BTFE Diluent

A coin cell was prepared with a 15-mm diameter silicon/graphite anode, a 14-mm diameter NMC532 (Li($Ni_{0.5}Mn_{0.3}Co_{0.2}$)$O_2$) cathode, and 45 µL electrolyte; the coin cell had a n/p ratio of ~1.2, where the n/p ratio is the areal capacity ratio of the negative to positive electrode. The anode composition was 73 wt % MagE3 graphite, (Hitachi Chemical Co. America, Ltd., San Jose, Calif.), 15 wt % silicon (Paraclete Energy, Chelsea, Mich.), 2 wt % Timcal C45 carbon (Imerys Graphite & Carbon USA Inc., Westlake, Ohio), and 10 wt % LiPAA ($H_2O$), LiOH titrated; the electrode area was 1.77 $cm^2$, and the coating thickness was 27 µm with a total coating loading of 3.00 mg/$cm^2$. The cathode composition was 90 wt % NMC532 (Toda America, Battle Creek, Mich.), 5 wt % Timcal C45 carbon, and 5 wt % Solef® 5130 PVDF (Solvay, Brussels, Belgium); the electrode area was 1.54 $cm^2$, and the coating thickness was 42 µm with a total coating loading of 11.40 mg/$cm^2$. Cathodes and anodes were provided by the CAMP Facility of Argonne National Laboratory. The full cell capacity was 2 mAh.

Figure 5:
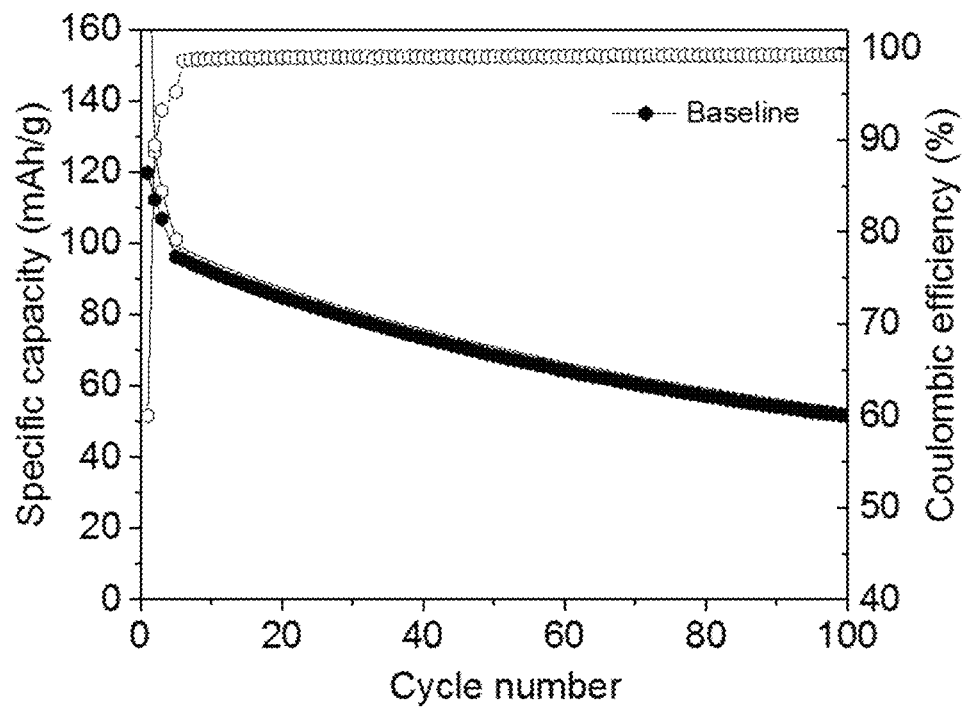
FIG. 5 shows the cycling performance of a coin cell over 100 cycles with a silicon/graphite (Si/Gr) anode including a LiPAA binder, an NMC532 cathode, and a baseline electrolyte comprising 1.2 M LiPF$_6$ in EC/EMC (3:7 by weight) with 10 wt % FEC.

Battery-grade $LiPF_6$, EC, EMC, and FEC were purchased from BASF Corporation and used as received. Battery-grade LiFSI was obtained from Nippon Shokubai Co., Ltd. Bis(2,2,2-trifluoroethyl) ether (BTFE, 99+%) was purchased from SynQuest Laboratories. The baseline electrolyte was 1.2 M $LiPF_6$ in EC/EMC (3:7 by weight) with 10 wt % FEC. The cell performance over 100 cycles is shown in FIG. 5. The first cycle Coulombic efficiency (FCE) was 60-65%, the specific capacity retention at 50 cycles was 71.2%, and the specific capacity retention at 100 cycles was 53.4%.

Figure 6:
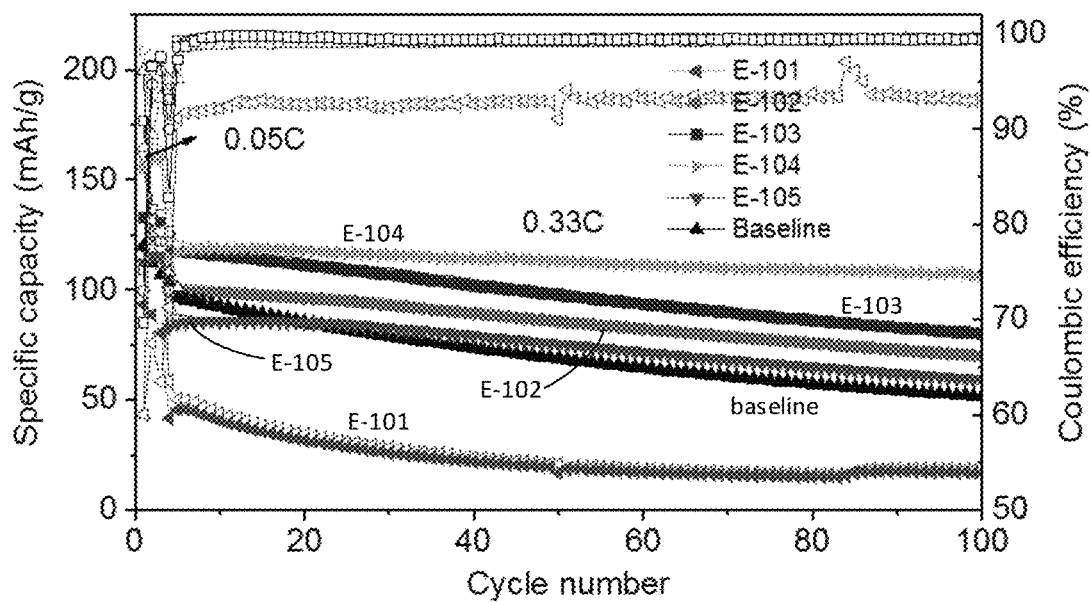
FIG. 6 shows the cycling performance of coin cells over 100 cycles with a Si/Gr anode including a LiPAA binder, an NMC532 cathode, and various electrolytes including the baseline electrolyte of FIG. 5, a superconcentrated electrolyte, and several LSEs as disclosed herein.

Additional electrolytes were prepared and evaluated at an operating voltage window from 3 to 4.1 V. Cyclic voltammetry shows that the electrolyte is stable up to 5 V. The results are summarized in Table 1 and shown in FIG. 6. The results demonstrate that LSEs including LiFSI, a carbonate-based solvent, a diluent, and FEC are compatible with Si/Gr anodes including a LiPAA binder. E-104 provided the best results with FCE of 75%, specific capacity at the $4^{th}$ cycle of 117.6 mAh/g, and 71% specific capacity retention at 100 cycles.

TABLE 1

| | Electrolyte | FCE | Specific Capacity at $4^{th}$ cycle (mAh/g) | Retention at $100^{th}$ cycle (mAh/g) |
|---|---|---|---|---|
| Baseline | 1.2M $LiPF_6$ in EC-EMC (3:7 by wt) + 10 wt % FEC | 60% | 96.3 | 60% |
| E-101 | 6M LiFSI in EC-EMC (3:7 by wt) + 5 wt % FEC | 60% | 41.8 | 40% |
| E-102 | 2.9M LiFSI in EC-EMC (3:7 by wt)-1 BTFE (molar ratio to EC-EMC) + 5 wt % FEC | 73% | 99.1 | 71% |
| E-103 | 2.5M LiFSI in EC-EMC (3:7 by wt)-1.5 BTFE (molar ratio to EC-EMC) + 5 wt % FEC | 75% | 117.6 | 67% |
| E-104 | 1.8M LiFSI in EC-EMC (3:7 by wt)-2 BTFE (molar ratio to EC-EMC) + 5 wt % FEC | 75% | 114.8 | 92.4% |
| E-105 | 1.2M LiFSI in EC-EMC (3:7 by wt)-3 BTFE (molar ratio to EC-EMC) + 5 wt % FEC | 70% | 82.9 | 71% |

Figure 7:
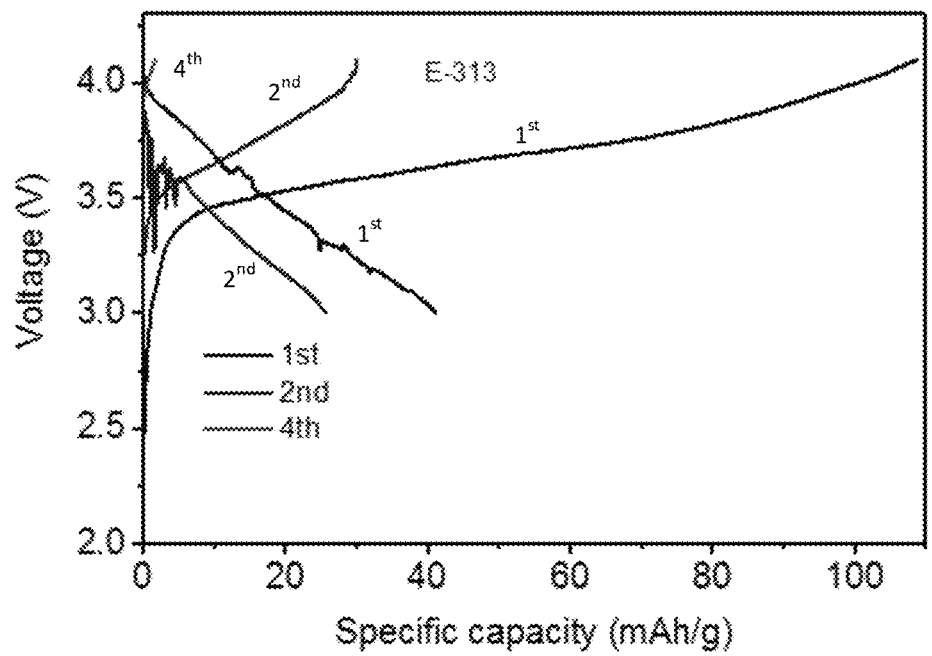
FIG. 7 is a graph of voltage versus specific capacity for the first, second, and fourth cycles of a coin cell with a Si/Gr anode including a LiPAA binder, an NMC532 cathode, and an LSE comprising 1.2M LiFSI in TEPa-3BTFE (E-313).
Figure 8:
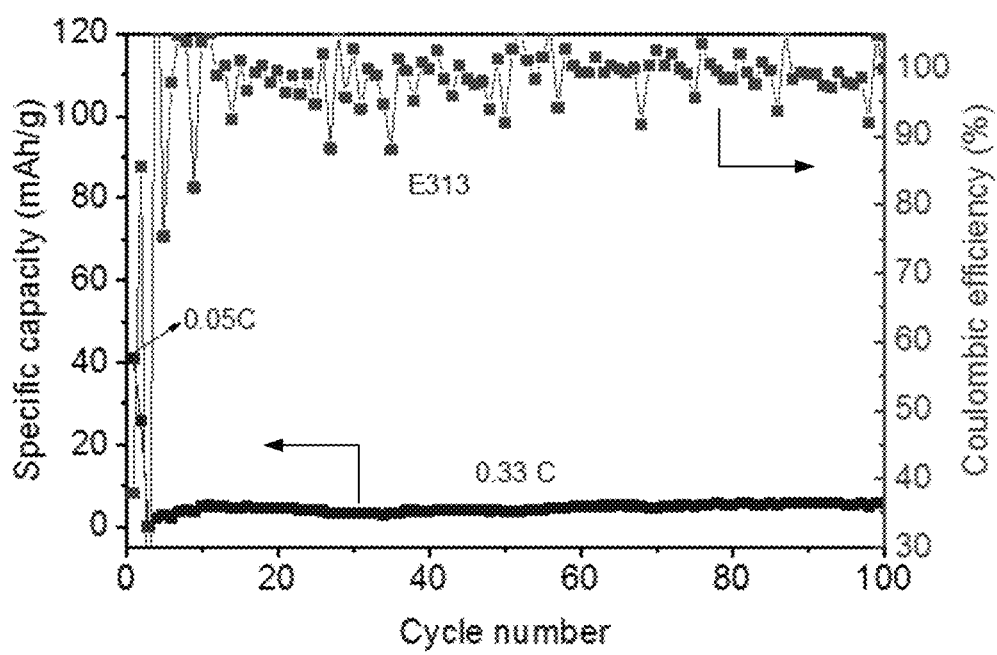
FIG. 8 shows the cycling performance of the coin cell of FIG. 7 over 100 cycles.

A nonflammable electrolyte comprising 1.2 M LiFSI in TEPa-3BTFE was prepared and evaluated in the coin cell. The results are shown in Table 2 and FIGS. 7-8. The TEPa-based LSE was incompatible with the anode as evidenced by a first cycle Coulombic energy of only 37.87% and zero capacity retention after 80 cycles.

TABLE 2

| | Electrolyte | FCE | Specific Capacity at $4^{th}$ cycle (mAh/g) | Retention at $80^{th}$ cycle (mAh/g) |
|---|---|---|---|---|
| Baseline | 1.2M $LiPF_6$ in EC-EMC (3:7 by wt) + 10 wt % FEC | 60% | 96.3 | 60% |
| E-313 | 1.2M LiFSI in TEPa-3BTFE (molar ratio to TEPa) | 37.87% | 41.1 | 0 |

The anode was modified to replace the LiPAA binder with a polyimide binder and to include nano-silicon coated with carbon by chemical vapor deposition (CVD). The anode composition was as follows: 73 wt % Hitachi MagE3 graphite, 15 wt % Paraclete Energy C/Si (10% CVD carbon in the C/Si composite, 2 wt % Timcal C45 carbon, and 10 wt % polyimide (PI); the coating thickness was 26 μm with a total coating loading of 3 mg/cm$^2$.

Figure 9:
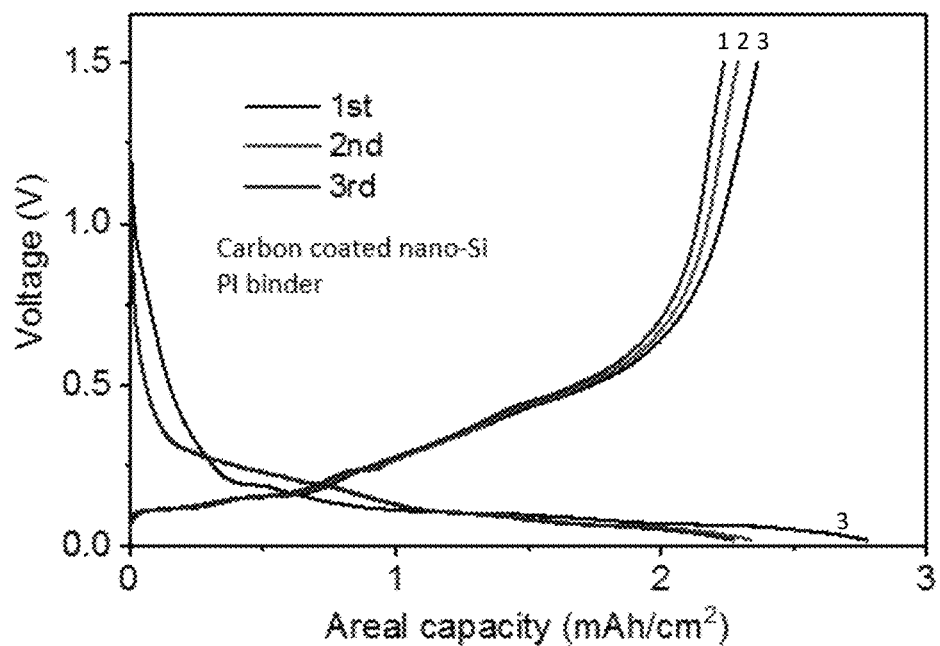
FIG. 9 is a graph of voltage versus specific capacity for the first, second, and third cycles of a coin cell with a Si/Gr anode including a polyimide binder, an NMC532 cathode, and the baseline electrolyte.

A coin cell was prepared with the modified anode, the cathode of Example 1, and the baseline electrolyte (1.2 M $LiPF_6$ in EC/EMC (3:7 by weight)+10 wt % FEC–"Gen2+ 10% FEC"). FIG. 9 is a graph of the voltage versus areal capacity for the first, second, and third cycles.

Figure 10:
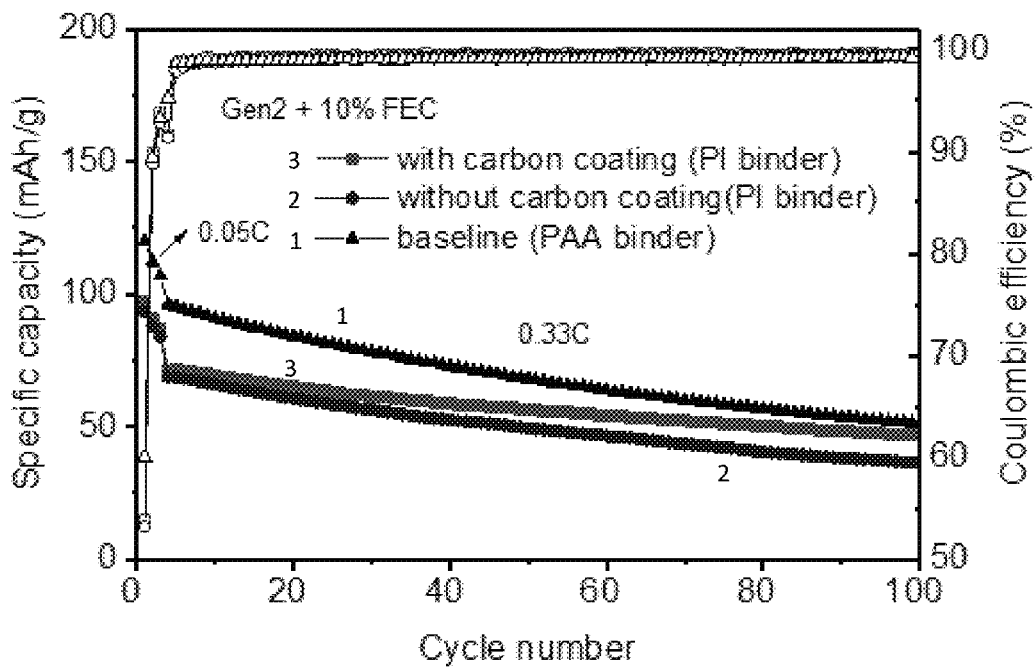
FIG. 10 shows the cycling performance of coin cells over 100 cycles with the baseline electrolyte, an NMC532 cathode, and various anodes—Si/Gr anode including a LiPAA binder, Si/Gr anode including a PI binder, and carbon-coated Si/Gr anode including a PI binder.

The effects of the binder and the carbon-coated nano-silicon were evaluated in coin cells with the baseline electrolyte with (i) the anode of Example 1 (baseline anode), (ii) an anode with non-coated silicon and PI binder, and (iii) an anode with carbon-coated nano-silicon and PI binder. The results are shown in Table 3 and FIG. 10.

TABLE 3

| Electrolyte: 1.2M $LiPF_6$ in EC/EMC (3:7 by weight) + 10 wt % FEC | | | |
|---|---|---|---|
| Anode | FCE | Specific capacity at $4^{th}$ cycle (mAh/g) | Retention at $100^{th}$ cycle |
| Baseline (Si-LiPAA binder) | 60% | 96.3 | 53.4% |
| Si-PI binder | 53% | 68.9 | 53% |
| Carbon-coated Si-PI binder | 54% | 71.1 | 65% |

The PI binder leads to a lower specific capacity than the baseline anode, which may be related to the irreversible capacity and low FCE from PI. The combination of carbon-coated Si and PI binder had improved cycling stability compared to the PI binder with uncoated Si.

Figure 11:
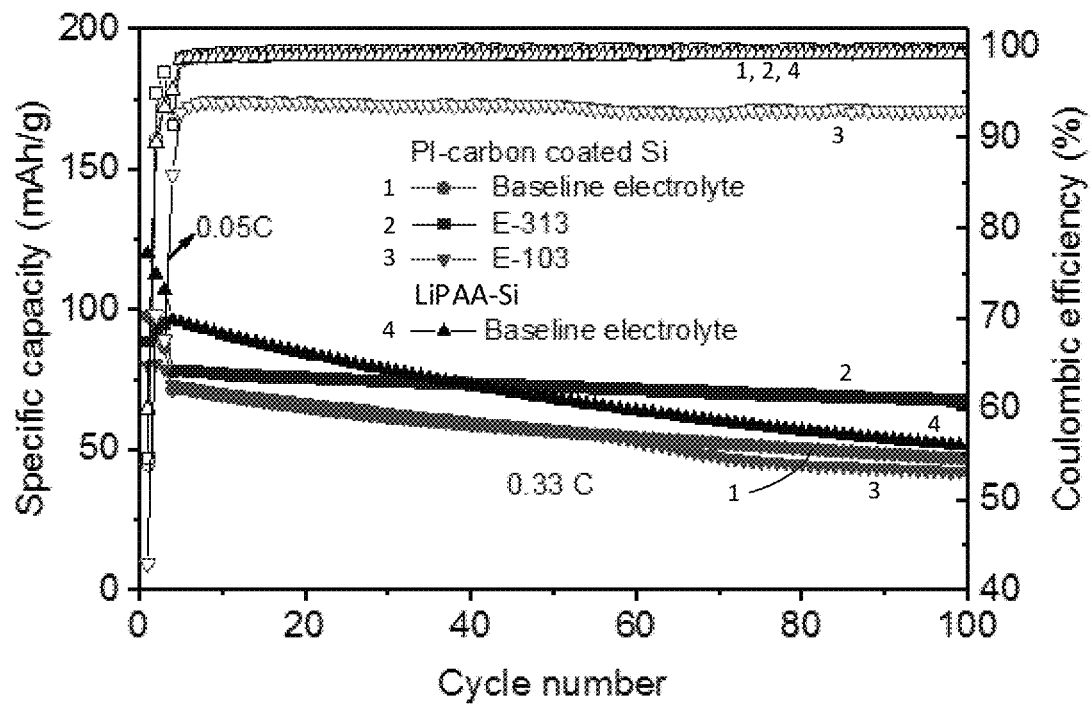
FIG. 11 shows the cycling performance of coin cells over 100 cycles with an NMC cathode, a carbon-coated Si/Gr anode including a PI binder, and the baseline electrolyte, an LSE (E-103) comprising 2.5 M LiFSI in EC-EMC (3:7 by wt)-1.5 BTFE (molar ratio to EC-EMC)+5 wt % FEC, and an LSE (E-313) comprising 1.2 M LiFSI in TEPa-3BTFE (molar ratio to TEPa).

The carbon-coated Si/Gr anode with PI binder was further evaluated in coin cells with the baseline electrolyte and electrolytes E-103 and E-313. The results are shown in Table 4 and FIG. 11. The modified anode showed significantly improved cycling stability in the E-313 electrolyte. However, the capacity is still lower due to the irreversible capacity and low FCE attributable to the PI binder.

TABLE 4

| Anode | | Electrolyte | FCE | Specific capacity at $4^{th}$ cycle (mAh/g) | Retention at $100^{th}$ cycle |
|---|---|---|---|---|---|
| Si-LIPAA binder | Baseline | 1.2M $LiPF_6$ in EC/EMC (3:7 by weight) + 10% FEC | 60% | 96.3 | 53.4% |
| Carbon-coated Si-PI binder | | | 54% | 71.1 | 65% |
| | E-103 | 2.5M LiFSI in EC-EMC (3:7 by wt)-1.5 BTFE + 5 wt % FEC | 43% | 72.9 | 57.3% |
| | E-313 | 1.2M LiFSI in TEPa-3BTFE | 55% | 78 | 86.5% |

Figure 12:
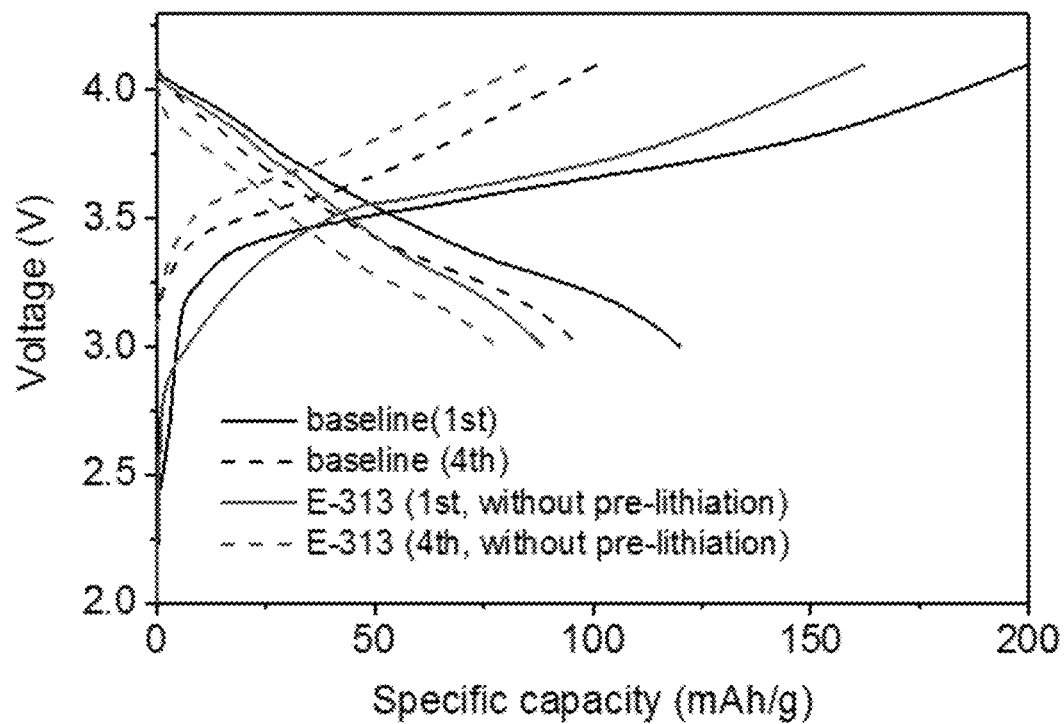
FIG. 12 is graph of voltage versus specific capacity for the first and fourth cycles of coin cells with an NMC cathode, an LSE (E-313) comprising 1.2 M LiFSI in TEPa-3BTFE (molar ratio to TEPa), and a carbon-coated Si/Gr anode including a PI binder with and without prelithiation.
Figure 13:
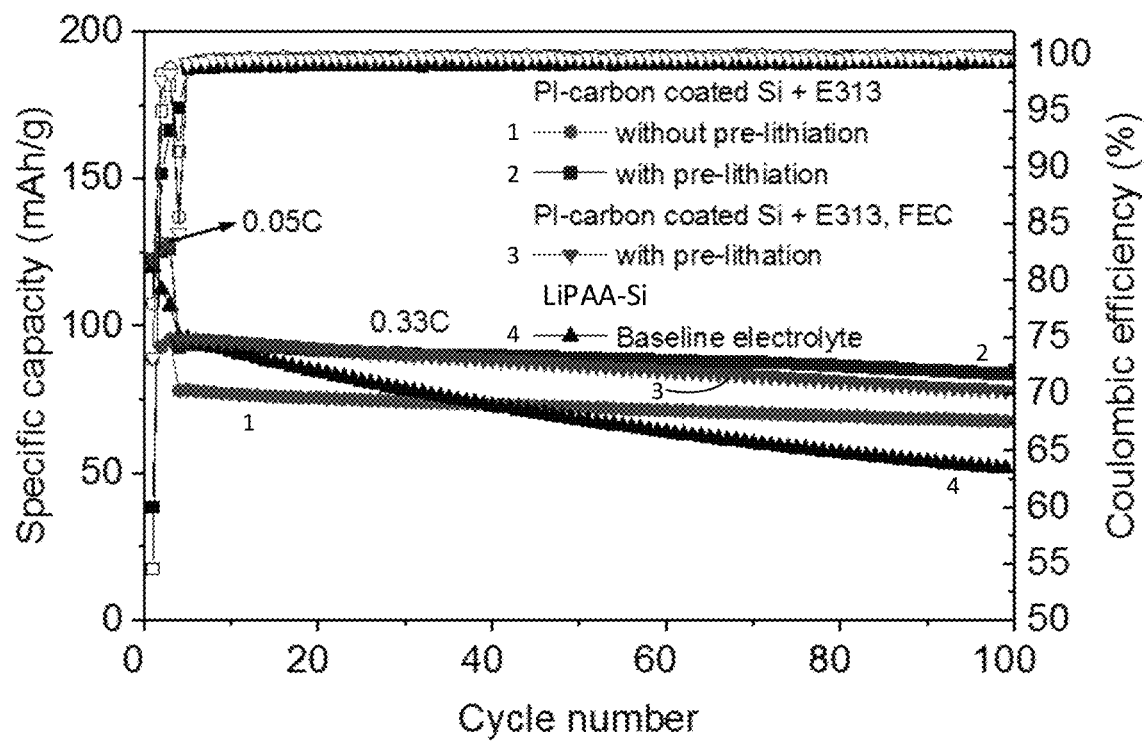
FIG. 13 shows the cycling performance of coin cells over 100 cycles with an NMC cathode, a carbon-coated Si/Gr anode including a PI binder with and without prelithiation, and LSEs comprising 1.2 M LiFSI in TEPa-3BTFE (molar ratio to TEPa) or 1.2 M LiFSI in TEPa-3BTFE (molar ratio to TEPa)+1.2 wt % FEC.

The effects of anode prelithiation were evaluated in coin cells including the carbon-coated Si/Gr anode with PI binder, an NMC cathode, and electrolyte E-313 or electrolyte E-313+1.2 wt % FEC. Prelithiation was done with 3 formation cycles of the anodes in the half-cell configuration. The results are shown in Table 5 and FIGS. 12 and 13. The results demonstrate that E-313 in combination with a prelithiated anode provides a significant benefit with respect to both specific capacity at the $4^{th}$ cycle and capacity retention. The inclusion of FEC provided a higher specific capacity at the $4^{th}$ cycle, but retention was lower. The results confirm that the cell specific capacity can be >90 mAh/g with prelithiation treatment, and that the low specific capacity is attributable to the low FCE of the PI binder.

TABLE 5

| Anode | Prelithiation | Electrolyte | FCE | Specific capacity at $4^{th}$ cycle (mAh/g) | Retention at $100^{th}$ cycle |
|---|---|---|---|---|---|
| Si-LIPAA binder | No | Baseline 1.2M $LiPF_6$ in EC/EMC (3:7 by weight) + 10% FEC | 60% | 96.3 | 53.4% |

TABLE 5-continued

| Anode | Prelithiation | Electrolyte | FCE | Specific capacity at 4$^{th}$ cycle (mAh/g) | Retention at 100$^{th}$ cycle |
|---|---|---|---|---|---|
| Carbon-coated Si-PI binder | No<br>Yes<br>Yes | E-313<br>E-313 + FEC | 1.2M LiFSI in TEPa-3BTFE<br>1.2M LiFSI in TEPa-3BTFE + 1.2 wt % FEC | 55%<br>78%<br>73% | 78<br>92.8<br>95.8 | 86.5%<br>90.3%<br>82% |

Figure 14:
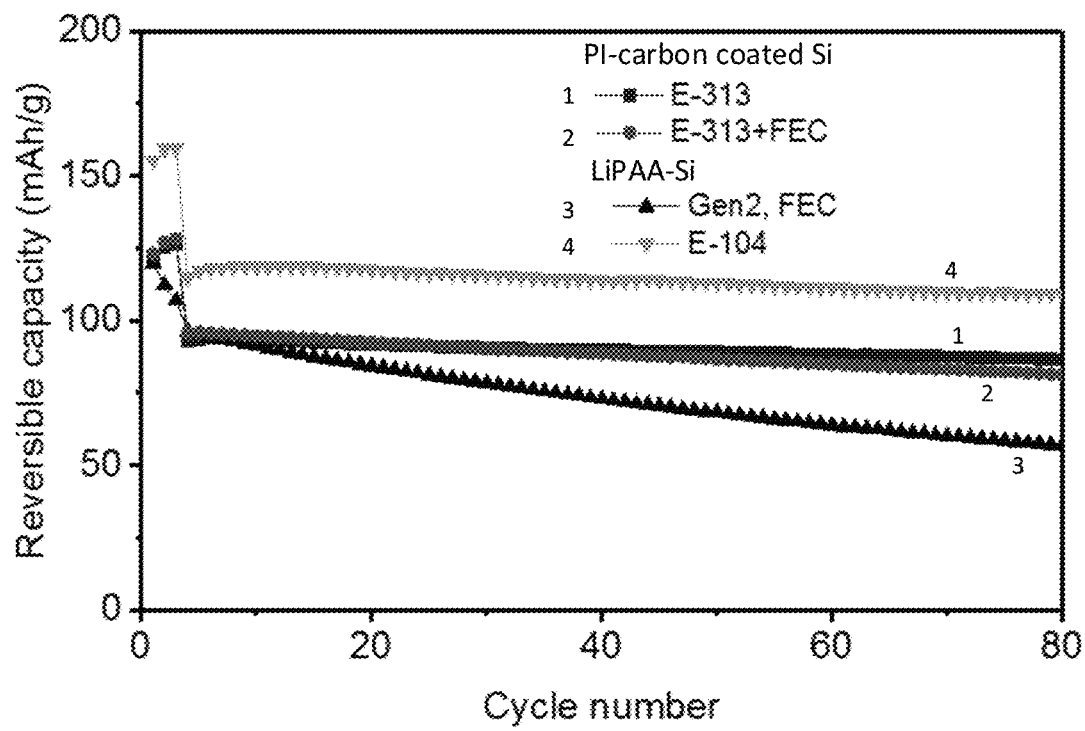
FIG. 14 shows the cycling performance of coin cells over 80 cycles with an NMC cathode, a Si/Gr anode with LiPAA binder or a carbon-coated Si/Gr anode with PI binder, and exemplary LSEs as disclosed herein.

FIG. 14 summarizes the results of effective LSE electrolytes for Si/Gr anodes with LiPAA binder and prelithiated carbon-coated Si/Gr anodes with PI binder. The electrolytes are the baseline "Gen2, FEC" (1.2 M LiPF$_6$ in EC/EMC (3:7 by weight)+10 wt % FEC), E-104 (Table 1), E-313 (Table 5), and E-313+FEC (Table 5). The results show that an LSE including LiFSI in EC-EMC effectively enhances capacity and cycling stability for Si/Gr anodes with LiPAA binder. An LSE including LiFSI in TEPa effectively improves cycling stability for carbon-coated Si/Gr anodes with PI binder; the capacity is greater than that of the cell including the Si/Gr-LiPAA anode with the baseline "Gen2, FEC" electrolyte, but remains lower than the cell with the Si/Gr-LiPAA anode and the LSE including LiFSI in EC-EMC.

Example 2

Si/Gr‖NMC532 Cells Using LSEs with Different Diluents

Figure 15:
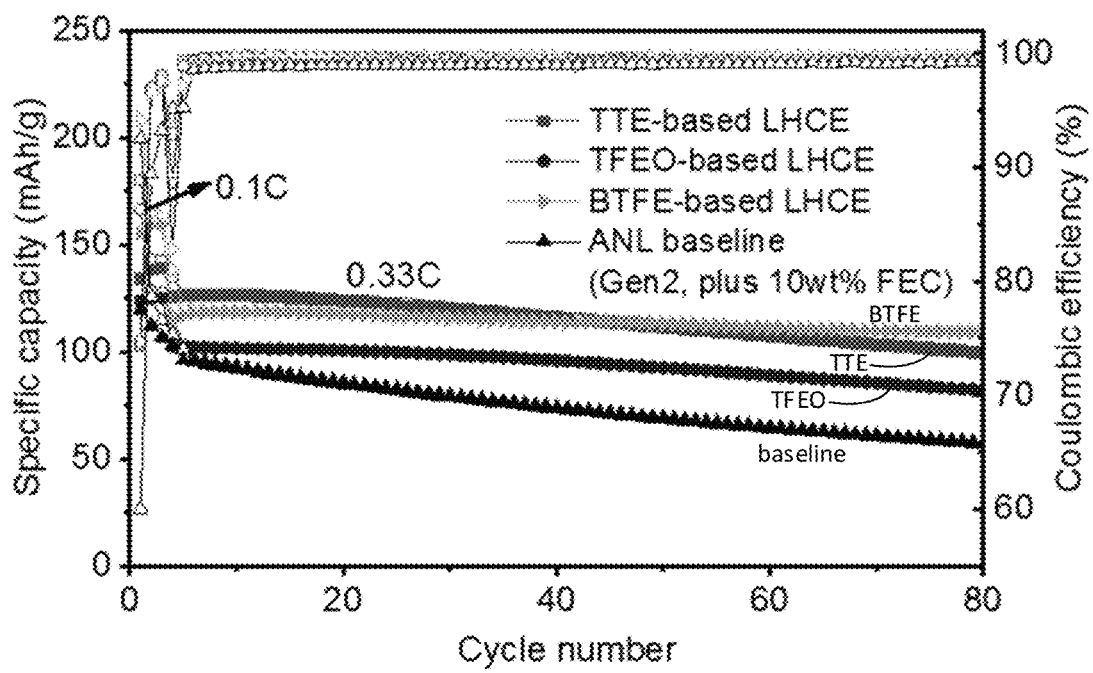
FIG. 15 shows cycling performance of Si/Gr||NMC532 in LSEs comprising 1.8 M LiFSI in EC-EMC (3:7 by wt)+5 wt % FEC and BTFE, TTE or TFEO (molar ratio of 2 relative to EC/EMC).

Different diluents were also investigated and compared with LiFSi-EC:EMC based LSEs (LHCEs). The salt concentrations for these three electrolytes were the same. The results in FIG. 15 and Table 6 show that all three diluents (BTFE, TTE, and TFEO) improved the cycling stability and FCE. The TTE-based LHCE demonstrated higher specific capacity but slightly worse cycling stability compared to the BTFE-based LHCE. The TFEO-based LHCE exhibited lower specific capacity compared to both TTE and BTFE-based LHCEs, which could be attributed to the difference of viscosity and conductivity of these three electrolytes. Both TTE and TFEO-based LHCEs demonstrated similar cycling stability (80%) after 80 cycles. Among these three electrolytes, the BTFE-based LHCE showed the best electrochemical behavior in terms of the cycling stability and the specific capacity.

TABLE 6

| | Electrolyte | FCE | Retention @ 80th cycle |
|---|---|---|---|
| Baseline | 1.2M LiPF$_6$ in EC-EMC (3:7 by wt.) + 10 wt. % FEC | 60% | 60% |
| TTE-based | 1.8M LiFSI in EC-EMC (3:7 by wt.) -2TTE (molar ratio to EC/EMC) + 5 wt % FEC | 74% | 80% |
| TFEO-based | 1.8M LiFSI in EC-EMC (3:7 by wt.)-2TFEO (molar ratio to EC/EMC) + 5 wt % FEC | 73% | 80% |
| BTFE-based (E-104) | 1.8M LiFSI in EC-EMC (3:7 by wt.)-2BTFE (molar ratio to EC/EMC) + 5 wt % FEC | 75% | 92.4% |

Figure 16:
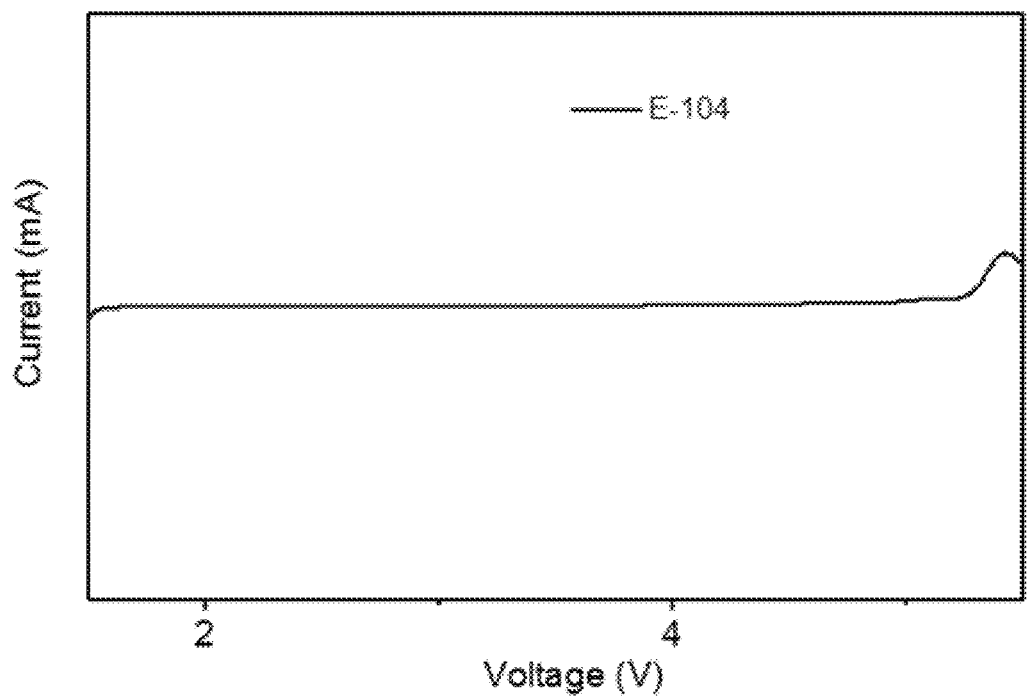
FIG. 16 shows the cyclic voltammetry curve of 1.8M LiFSI in EC-EMC (3:7 by wt.)-2BTFE (molar ratio to EC/EMC)+5 wt % FEC (E-104). Scan rate was 0.1 mV/s.
Figure 17:
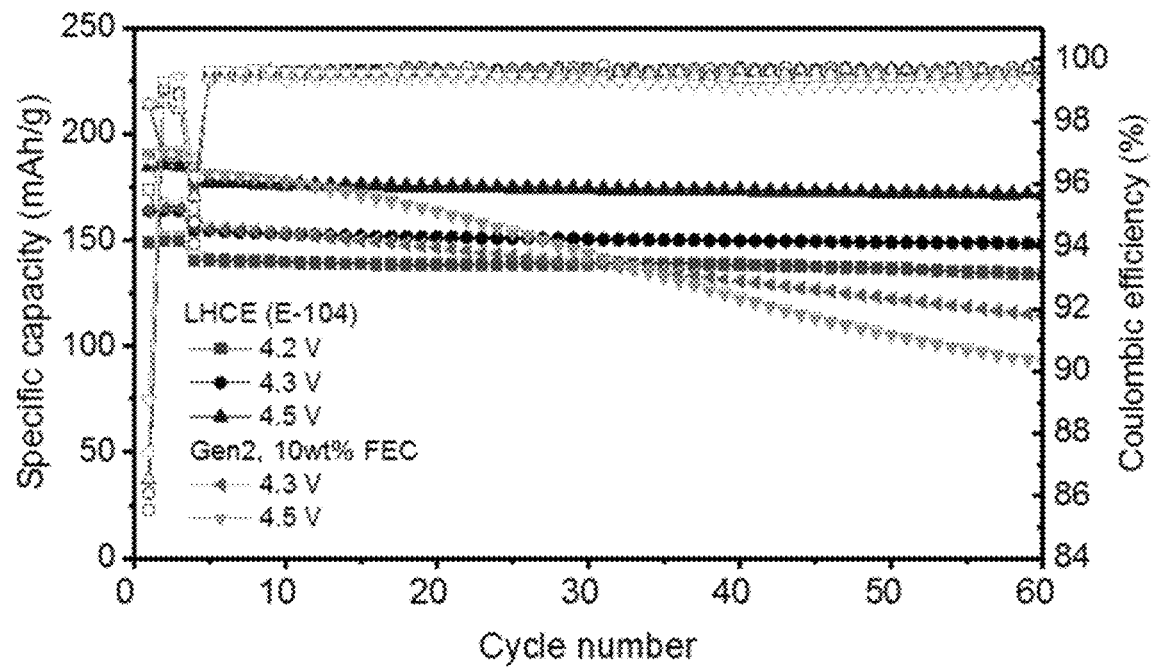
FIG. 17 shows cycling performance of NMC532//Li in the LSE E-104 or baseline electrolyte at different upper voltage plateaus.

The voltage window of the E-104 LSE was investigated by cyclic voltammetry (CV) measurement, as shown in FIG. 16. The result shows that E-104 is stable up to 5V. The electrochemical performance of E-104 at different upper voltages was also investigated with a Li‖NMC532 cell configuration as shown in FIG. 17. The Li‖NMC532 cells demonstrated stable cycling stability up to 4.5 V with E-104. In contrast, the cells with baseline electrolyte (Gen2, 10 wt % FEC) showed rapid capacity fading when the cells were charged to 4.3 V.

Example 3

Si/Gr‖NMC333 Cells with LSEs

Nonflammable electrolytes were evaluated with silicon (Si)-based anodes. A Si/graphite (Si/Gr) composite with a theoretical capacity of 1000 mAh/g was obtained from BTR New Energy Materials Inc., China. The Si/Gr electrode was composed of 80 wt % BTR-1000 as active material, 10 wt % Super-P® carbon as conducting agent and 10 wt % polyimide (PI) as binder. Electrode disks with a diameter of 1.27 cm and an average mass loading of 2.15 mg cm$^{-2}$ were punched, dried and stored in a glove box filled with purified argon. Battery-grade LiPF$_6$, EC, EMC, and FEC were purchased from BASF Corporation and used as received. LiFSI in battery grade was obtained from Nippon Shokubai Co., Ltd. Bis(2,2,2-trifluoroethyl) ether (BTFE, 99+%) was purchased from SynQuest Laboratories. TEPa was purchased from Sigma-Aldrich. Two BTFE-diluted nonflammable electrolytes were prepared: NFE-1 comprised LiFSI, TEPa and BTFE with a molar ratio of 0.75:1:3; NFE-2 comprised LiFSI-1.2TEPa-0.13FEC-4BTFE (molar ratio, and the amount of FEC is 1.2 wt %). The molarity of LiFSI in NFE-2 was 1.2 M. Three control electrolytes, 1.15 M LiPF$_6$ in EC-EMC (3:7 by wt.) with different amounts of FEC (2, 5 and 10 wt %, named as E-control 1, E-control 2 and E-control 3, respectively) were prepared and evaluated for comparison, as summarized in Table 7.

TABLE 7

| Name | Formulation | Flammability |
|---|---|---|
| E-control 1 | 1M LiPF$_6$ in EC-EMC (3:7 by wt.) + 2 wt % FEC | highly flammable |
| E-control 2 | 1M LiPF$_6$ in EC-EMC (3:7 by wt.) + 5 wt % FEC | highly flammable |
| E-control 3 | 1M LiPF$_6$ in EC-EMC (3:7 by wt.) + 10 w.t % FEC | highly flammable |
| NFE-1 | LiFSI-1.33TEPa-4 BTFE | nonflammable |
| NFE-2 | LiFSI-1.2TEPa-0.13FEC-4BTFE | nonflammable |

Figure 18:
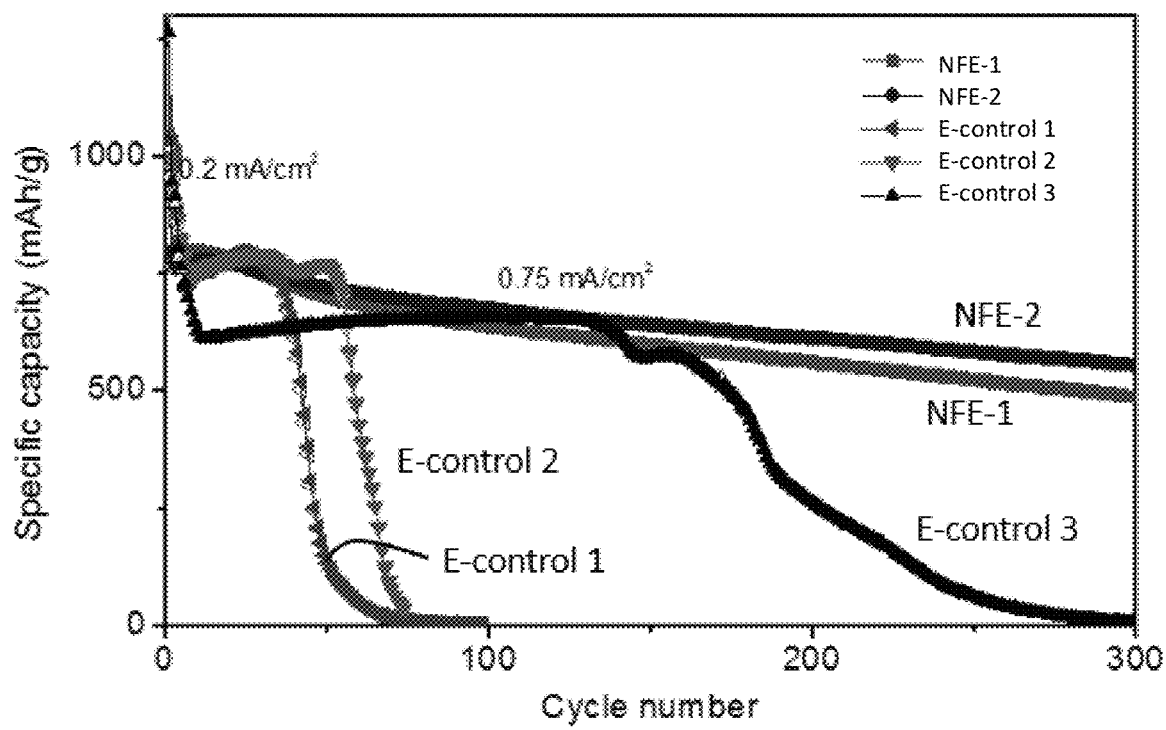
FIG. 18 is a graph showing cycling performance of Li||Si/Gr batteries using two non-flammable electrolytes, LiFSI-1.33TEPa-4 BTFE and LiFSI-1.2TEPa-0.13FEC-4BTFE, and three control electrolytes, 1 M LiPF$_6$ in EC-EMC (3:7 by wt.)+2 wt % FEC, 1 M LiPF$_6$ in EC-EMC (3:7 by wt.)+5 wt % FEC, and 1 M LiPF$_6$ in EC-EMC (3:7 by wt.)+10 wt % FEC.

FIG. 18 shows the cycling performance of Li‖Si/Gr half cells with the BTFE diluted electrolytes (NFE-1, squares;

NFE-2, circles) and the three control electrolytes. The Si/Gr electrode in NFE-1 electrolyte delivered an initial reversible capacity of 770 mAh/g with a capacity retention of 66.2% after 300 cycles, while the Si/Gr electrode with FEC containing nonflammable electrolyte (NFE-2) had an initial reversible capacity of 762 mAh/g with a capacity retention of 73% after 300 cycles. In terms of the conventional electrolyte (E-control-3) which has the similar FEC amount with NFE-2, the capacity quickly dropped after 40 cycles. When the amount of FEC was increased to 5 and 10 wt %, the cycling performance was extended to 60 cycles and 140 cycles, respectively.

Figure 19:
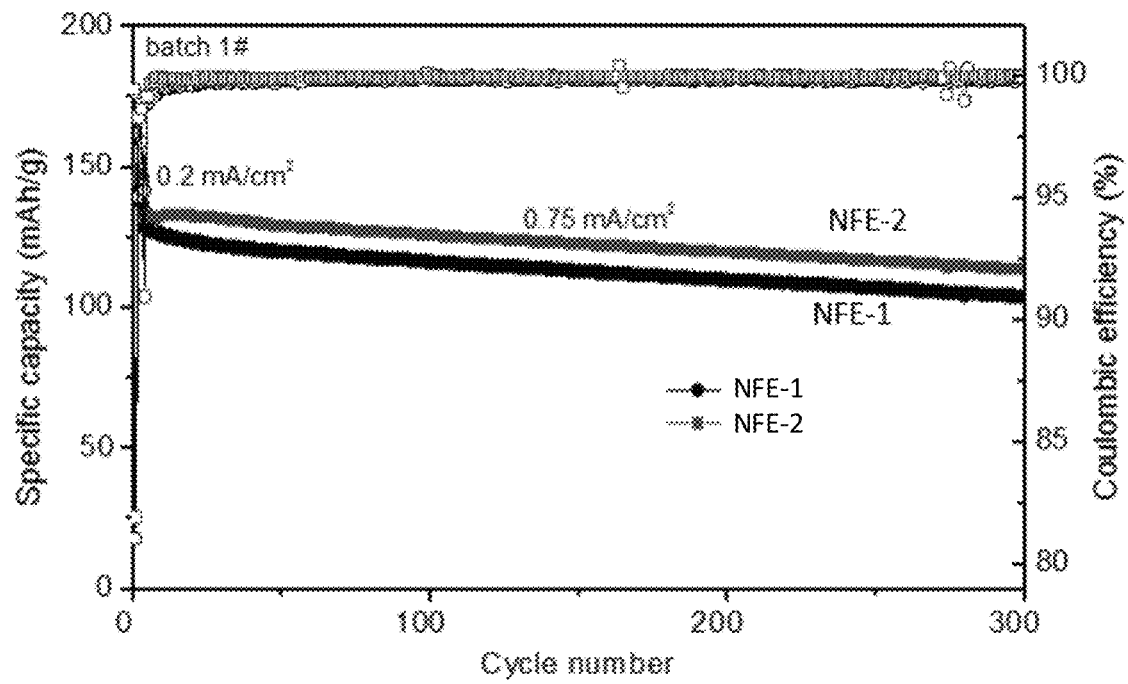
FIG. 19 is a graph showing cycling performance of Si/Gr||NMC333 batteries using two non-flammable electrolytes, LiFSI-1.33TEPa-4 BTFE and LiFSI-1.2TEPa-0.13FEC-4BTFE.

A full cell using a Si/Gr anode and commercial cathode material of NMC333 was also investigated. The specific capacity of the NMC333 cathode was ~150 mAh $g^{-1}$ and the areal capacity was ~1.5 mAh $cm^{-2}$ when charged at 0.5 mA $cm^{-2}$ and discharged at 0.75 mA $cm^{-2}$ at an operating voltage window from 2.8 to 4.2 V. The anode part was pre-cycled against Li metal in half cells to alleviate the challenges from the SEI formation and re-assembled into full cells. The cathode and anode capacity ratio of 1:1.1 was matched to obtain a good full cell performance. The slightly higher Si content is favorable to prevent the anodes from over lithiation during full-cell charge. FIG. 19 shows the cycling performance of Si/Gr∥NMC333 full cells with the two BTFE diluted electrolytes. The full cell with NFE-2 showed better cycling performance with a capacity retention of 86% after 300 cycles (81% for NFE-1 electrolyte).

Figure 20:
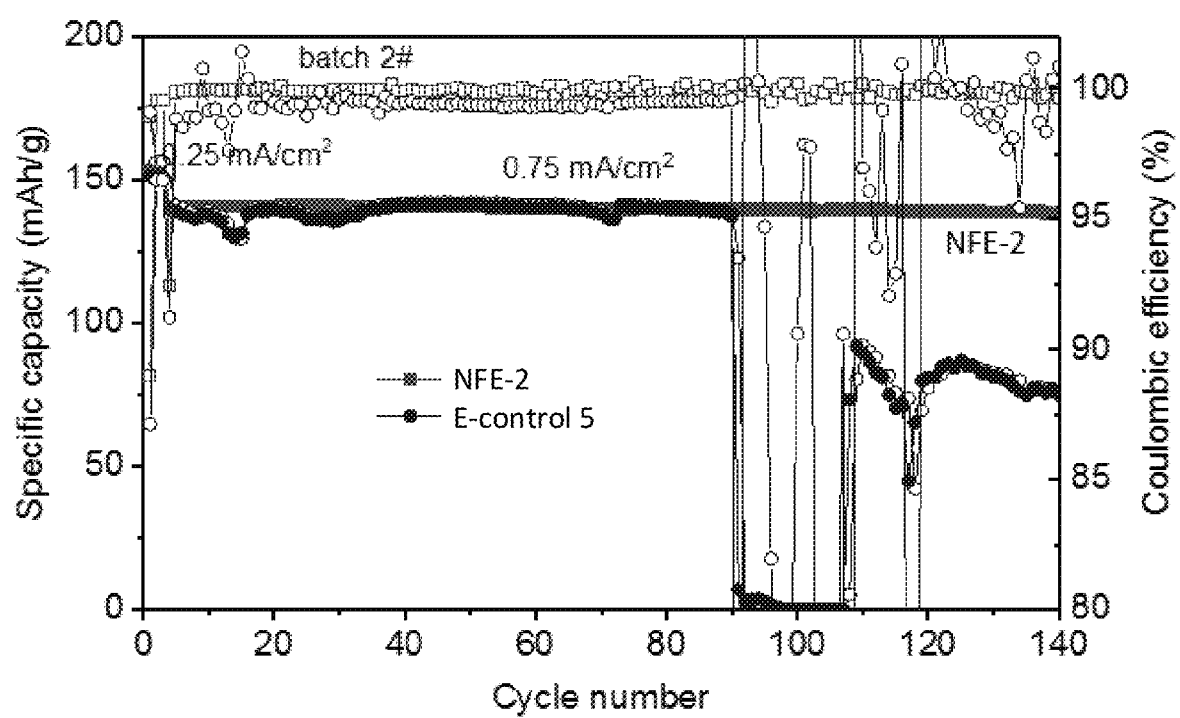
FIG. 20 is a graph showing cycling performance of Si/Gr||NMC333 batteries using a non-flammable electrolyte, LiFSI-1.2TEPa-0.13FEC-4BTFE, and a control electrolyte, 1 M LiPF$_6$ in EC-EMC (3:7 by wt.)+10 wt % FEC.
Figure 21:
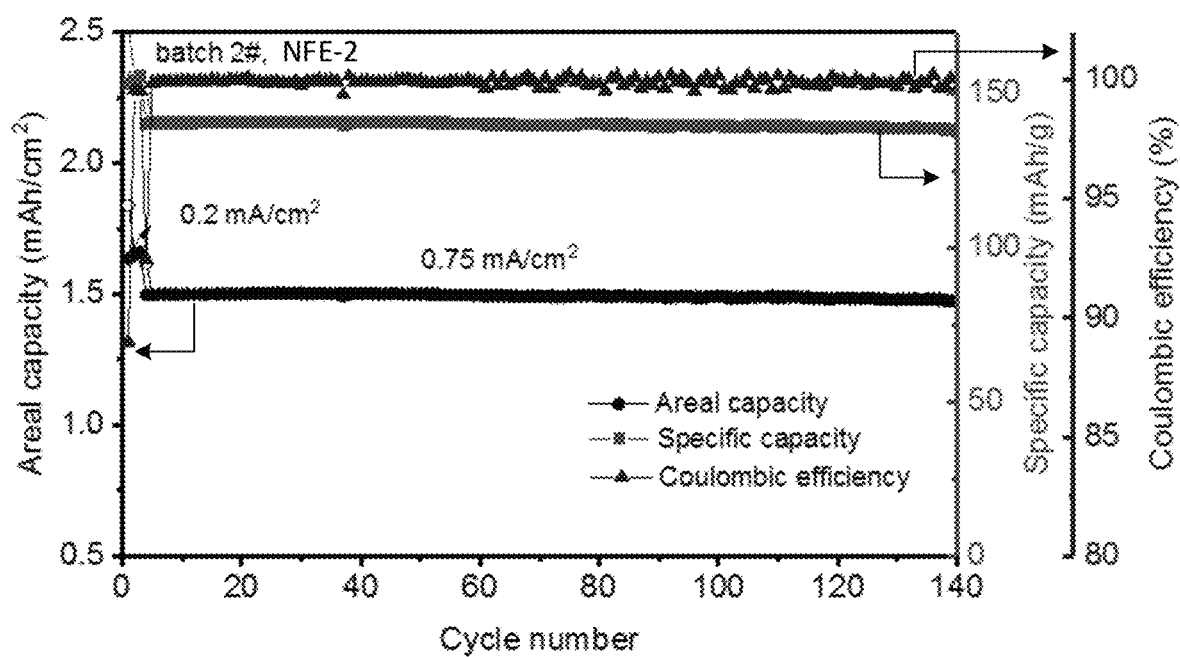
FIG. 21 is a graph showing areal capacity, specific capacity and Coulombic efficiency of Si/Gr||NMC333 batteries using LiFSI-1.2TEPa-0.13FEC-4BTFE.

A second batch of Si/Gr∥NMC333 cells with NFE-2 and E-control 3 were prepared. The first discharge capacity based on the NMC cathode was 147.9 mA h $g^{-1}$ with the initial Coulombic efficiency of 89% (FIGS. 20-21), which is very close to the value obtained in Li∥NMC333 half cells. The areal capacity was around 1.5 mAh/$cm^2$ (FIG. 21), and all the cells were still running after 140 cycles. In the case of the full cell based on E-control 3, the cells exhibited comparable specific capacity, but it started to quickly drop after 90 cycles. In addition, the cycle Coulombic efficiency of NFE-2 based full cell was higher than that of E-control 3 based cells.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:
1. A system comprising:
an electrolyte consisting essentially of
an active salt, wherein the active salt is a lithium salt,
a nonaqueous solvent, wherein the nonaqueous solvent is (i) a carbonate other than fluoroethylene carbonate (FEC), (ii) a flame retardant compound, or (iii) both (i) and (ii), wherein the active salt is soluble in the nonaqueous solvent;
0-30 wt % FEC; and
a diluent, wherein the diluent is a fluoroalkyl ether, a fluorinated orthoformate, or a combination thereof, wherein the active salt has a solubility in the diluent at least 10 times less than a solubility of the active salt in the nonaqueous solvent; and
an anode comprising silicon.
2. The system of claim 1, wherein the electrolyte includes from 2-30 wt % FEC.

3. The system of claim 1, wherein the active salt has a molar concentration in the electrolyte within a range of from 0.5 M to 6 M.
4. The system of claim 1, wherein the active salt is lithium bis(fluorosulfonyl)imide (LiFSI), lithium bis(trifluoromethanesulfonyl)imide (LiTFSI), lithium bis(pentafluoroethanesulfonyl)imide (LiBETI), lithium bis(oxalato)borate (LiBOB), $LiPF_6$, $LiAsF_6$, $LiBF_4$, $LiCF_3SO_3$, $LiClO_4$, lithium difluoro oxalato borate anion (LiDFOB), LiI, LiBr, LiCl, LiSCN, $LiNO_3$, $LiNO_2$, $Li_2SO_4$, or any combination thereof.
5. The system of claim 1, wherein the flame retardant compound is an organic phosphate, an organic phosphite, an organic phosphonate, an organic phosphoramide, a phosphazene, or any combination thereof.
6. The system of claim 5, wherein the flame retardant compound is triethyl phosphate, trimethyl phosphate, tributyl phosphate, triphenyl phosphate, tris(2,2,2-trifluoroethyl) phosphate, bis(2,2,2-trifluoroethyl) methyl phosphate; trimethyl phosphite, triphenyl phosphite, tris(2,2,2-trifluoroethyl) phosphite; dimethyl methylphosphonate, diethyl ethylphosphonate, diethyl phenylphosphonate, bis(2,2,2-trifluoroethyl) methylphosphonate; hexamethylphosphoramide; hexamethoxyphosphazene, hexafluorophosphazene, or any combination thereof.
7. The system of claim 1, wherein the carbonate other than FEC is ethylene carbonate (EC) and ethyl carbonate (EMC), or EC and diethyl carbonate (DEC), or EC and dimethyl carbonate (DMC), or EC and any combination of EMC, DEC, DMC, and propylene carbonate (PC).
8. The system of claim 1, wherein the diluent is bis(2,2,2-trifluoroethyl) ether (BTFE), 1,1,2,2-tetrafluoroethyl-2,2,3,3-tetrafluoropropyl ether (TTE), 1,1,2,2,-tetrafluoroethyl-2,2,2-trifluoroethyl ether (TFTFE), methoxynonafluorobutane (MOFB), ethoxynonafluorobutane (EOFB), tris(2,2,2-trifluoroethyl)orthoformate (TFEO), tris(hexafluoroisopropyl)orthoformate (THFiPO), tris(2,2-difluoroethyl)orthoformate (TDFEO), bis(2,2,2-trifluoroethyl) methyl orthoformate (BTFEMO), tris(2,2,3,3,3-pentafluoropropyl)orthoformate (TPFPO), tris(2,2,3,3-tetrafluoropropyl)orthoformate (TTPO), or any combination thereof.
9. The system of claim 1, wherein the diluent is BTFE, TTE, TFEO, or any combination thereof.
10. The system of claim 9, wherein the electrolyte consists essentially of:
1-3 M LiFSI;
EC-EMC in a ratio of from 4:6 to 2:8 by weight and 0-30 wt % FEC; and
the diluent, wherein a molar ratio of EC-EMC to the diluent is within a range of from 1-3.
11. The system of claim 9, wherein the electrolyte consists essentially of:
1-3 M LiFSI;
triethyl phosphate (TEPa) and 0-30 wt % FEC; and
the diluent, wherein a molar ratio of TEPa to the diluent is within a range of 2-4.
12. The system of claim 1, wherein the anode comprises a graphite/silicon composite.
13. The system of claim 12, wherein the anode further comprises a lithium polyacrylate or polyimide binder.
14. The system of claim 13, wherein the silicon is carbon-coated nano-silicon.
15. The system of claim 14, wherein the binder comprises a polyimide.
16. The system of claim 15, wherein the electrolyte consists essentially of:

1-3 M LiFSI:
triethyl phosphate (TEPa) and 0-30 wt % FEC; and
the diluent, wherein the diluent is BTFE, TTE, TFEO, or any combination thereof, and wherein a molar ratio of TEPa to the diluent is within a range of 2-4.

17. The system of claim 15, further comprising a cathode, wherein the anode is prelithiated and the system has a capacity retention ≥80% after 100 cycles.

18. The system of claim 13, wherein the binder comprises lithium polyacrylate, and the electrolyte consists essentially of:
1-3 M LiFSI;
EC-EMC in a ratio of 3:7 by weight and 0-30 wt % FEC; and
the diluent, wherein the diluent is BTFE, TTE, TFEO, or any combination thereof, and wherein a molar ratio of EC-EMC to the diluent is within a range of 1-3.

19. The system of claim 18, further comprising a cathode, wherein the system has a capacity retention ≥70% after 100 cycles.

20. The system of claim 1, further comprising a cathode, wherein the cathode comprises $Li_{1+w}Ni_xMn_yCo_zO_2$ (x+y+z+w=1, 0≤w≤0.25), $LiNi_xMn_yCo_zO_2$ (x+y+z=1), $LiNi_{0.8}Co_{0.15}Al_{0.05}O_2$, $LiCoO_2$, $LiNi_{0.5}Mn_{1.5}O_4$ spinel, $LiMn_2O_4$, $LiFePO_4$, $Li_{4-x}M_xTi_5O_{12}$ (M=Mg, Al, Ba, Sr, or Ta; 0≤x≤1), $MnO_2$, $V_2O_5$, $V_6O_{13}$, $LiV_3O_8$, $LiM^{C1}_xM^{C2}_{1-x}PO_4$ ($M^{C1}$ or $M^{C2}$=Fe, Mn, Ni, Co, Cr, or Ti; 0≤x≤1), $Li_3V_{2-x}M^1_x(PO_4)_3$ ($M^1$=Cr, Co, Fe, Mg, Y, Ti, Nb, or Ce; 0≤x≤1), $LiVPO_4F$, $LiM^{C1}_xM^{C2}_{1-x}O_2$ (($M^{C1}$ and $M^{C2}$ independently are Fe, Mn, Ni, Co, Cr, Ti, Mg, or Al; 0≤x≤1), $LiM^{C1}_xM^{C2}_yM^{C3}_{1-x-y}O_2$(($M^{C1}$, $M^{C2}$, and $M^{C3}$ independently are Fe, Mn, Ni, Co, Cr, Ti, Mg, or Al; 0≤x≤1; 0≤y≤1; 0≤x+y≤1), $LiMn_{2-y}X_yO_4$ (X=Cr, Al, or Fe, 0≤y≤1), $LiNi_{0.5-y}X_yMn_{1.5}O_4$ (X=Fe, Cr, Zn, Al, Mg, Ga, V, or Cu; 0≤y≤0.5), $xLi_2MnO_3\cdot(1-X)LiM^{C1}_yM^{C2}_zM^{C3}_{1-y-z}O_2$ ($M^{C1}$, $M^{C2}$, and $M^{C3}$ independently are Mn, Ni, Co, Cr, Fe, or mixture thereof; x=0.3-0.5; y≤0.5; z≤0.5), $Li_2M^2SiO_4$ ($M^2$=Mn, Fe, or Co), $Li_2M^2SO_4$ ($M^2$=Mn, Fe, or Co), $LiM^2SO_4F$ ($M^2$=Fe, Mn, or Co), $Li_{2-x}(Fe_{1-y}Mn_y)P_2O_7$ (0≤x≤1; 0≤y≤1), $Cr_3O_8$, $Cr_2O_5$, a carbon/sulfur composite, or an air electrode.

* * * * *